United States Patent [19]

Edwards et al.

[11] Patent Number: 5,083,591
[45] Date of Patent: Jan. 28, 1992

[54] PROCESS FOR DISPENSING LIQUID COLORANTS INTO A PAINT CAN, AND QUALITY CONTROL THEREFOR

[75] Inventors: Kenneth N. Edwards, Glendale; Edward D. Edwards, Healdsburg, both of Calif.; Philip Howlett, Wheaton; Larry Frederickson, Glendale Heights, both of Ill.

[73] Assignee: Dunn Edwards, Corp., & Fluid Management Ltd. Part., Los Angeles, Calif.

[21] Appl. No.: 432,991

[22] Filed: Nov. 6, 1989

[51] Int. Cl.⁵ ............................ B67D 5/60; B65B 3/36
[52] U.S. Cl. .................................... 141/9; 141/83; 141/94; 141/98; 141/103; 141/104; 141/157; 141/129; 366/605; 364/479; 235/462
[58] Field of Search ............... 141/9, 83, 94, 98, 102, 141/103, 104, 129, 156, 157; 366/605; 364/479; 235/462, 376

[56] References Cited

U.S. PATENT DOCUMENTS

| | | | |
|---|---|---|---|
| 2,787,402 | 4/1957 | Stiner et al. | 366/605 X |
| 2,848,019 | 8/1958 | Corbin et al. | 366/605 X |
| 3,029,847 | 4/1962 | Baudhuin et al. | 141/104 |
| 3,066,830 | 12/1962 | Heiss et al. | 141/104 X |
| 3,670,785 | 6/1972 | Heiss et al. | 141/9 |
| 3,959,636 | 5/1976 | Johnson et al. | |
| 4,109,143 | 8/1978 | Yamaguchi et al. | 235/462 |
| 4,230,266 | 10/1980 | Juvinall | 235/490 |
| 4,335,759 | 6/1982 | Pattipmi | 141/9 X |
| 4,525,071 | 6/1985 | Horowitz et al. | 366/152 |
| 4,554,955 | 11/1985 | Von Lersner et al. | 141/1 |
| 4,563,739 | 1/1986 | Gerpheide et al. | 364/403 |
| 4,585,148 | 4/1986 | Ito | 222/77 |
| 4,588,880 | 5/1986 | Hesser | 235/376 |
| 4,642,470 | 2/1987 | Planke | 250/566 |
| 4,705,083 | 11/1987 | Rossetti | 141/104 |
| 4,804,024 | 2/1989 | Arnemann | 141/165 |
| 4,827,993 | 5/1989 | Ito et al. | 141/83 |
| 4,913,198 | 4/1990 | Hayahara et al. | 141/83 |
| 4,967,938 | 11/1990 | Hellenberg | 141/104 X |

FOREIGN PATENT DOCUMENTS

| | | | |
|---|---|---|---|
| 1473125 | 1/1969 | Fed. Rep. of Germany | 141/104 |
| 9005666 | 5/1990 | PCT Int'l Appl. | 141/104 |

Primary Examiner—Ernest G. Cusick
Attorney, Agent, or Firm—Milton S. Gerstein; Morgan Fitch; Marvin N. Benn

[57] ABSTRACT

An automated paint-batching system for producing paint cans of any size and color. The system includes a plurality of paint-batching cells, with each cell having a machine comprised of either one or two dispensing stations. When two dispensing stations are used, the two dispensing stations are: A first tint-station, where a small volumetric dispensing of the base, water-base or oil-base, of the paint is dispensed, in order to wet the bottom of the can, at the first station, thereafter, is dispensed all of the liquid colorants making up the formula of the paint can, and a second base-dispensing station at which the remainder of the base of the formula of the paint is dispensed. Each of the first and second stations of the paint-batching machine of the invention has operatively associated therewith a weighing platform upon which rests the paint can during the dispensing at the respective station used in quality-control weighing of each dispensing. When only one dispensing station is used, all of the above-steps are performed at the one station. Each paint can has attached to it a bar-code label which represents a relocatable memory-address of the computer which stores the color-formula for that can and other information. The computer operating system controls the guidance of the particular paint can along its conveyance, so that the paint can is designated to one of a plurality of paint-batching cells of the system of the invention, with the bar-code of the paint can being read at a plurality of stations along the entire manufacturing process.

8 Claims, 29 Drawing Sheets

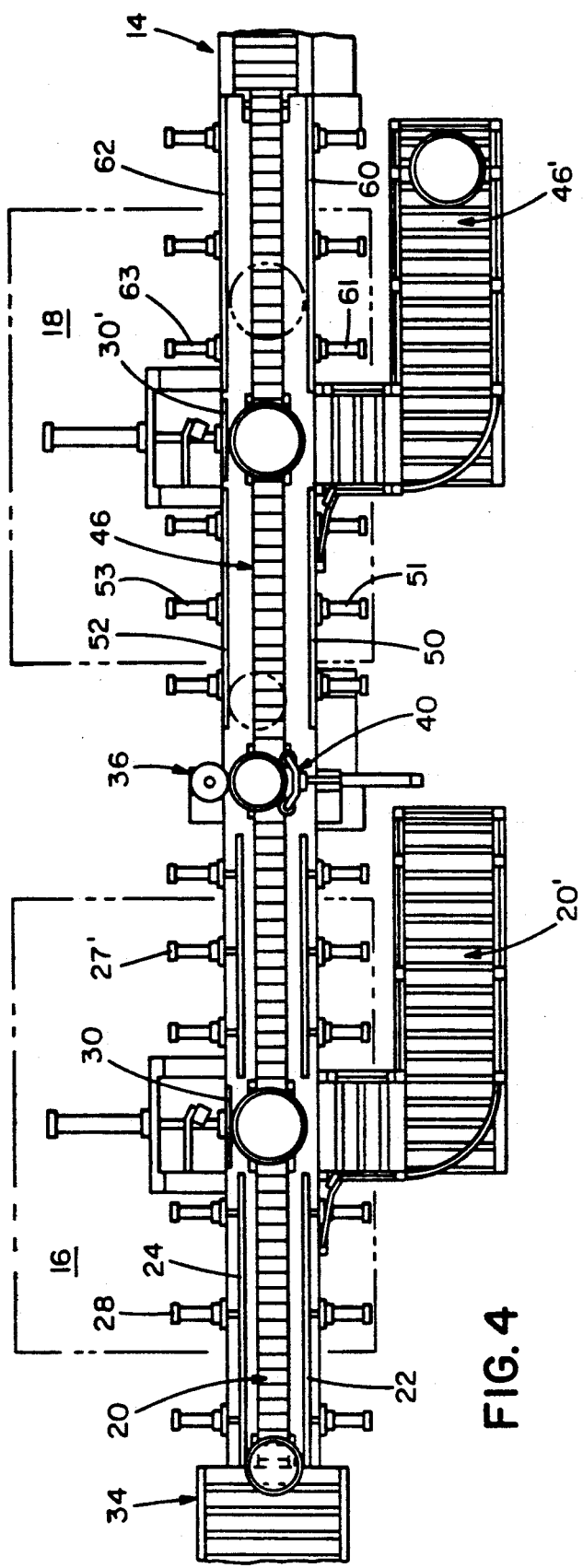
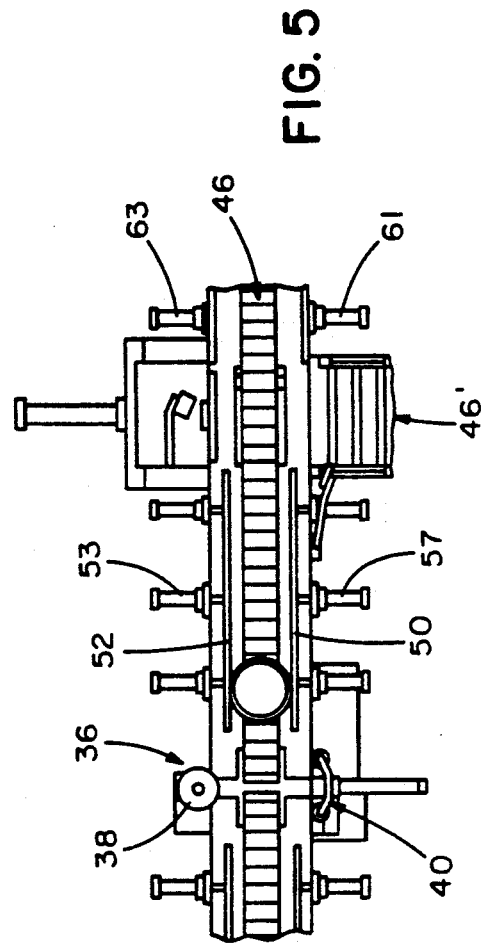

PROCESS FOR DISPENSING LIQUID COLORANTS INTO A PAINT CAN, AND QUALITY CONTROL THEREFOR

BACKGROUND OF THE INVENTION

The present invention is directed to an automated system for dispensing liquid colorants in a paint-batching process, by which an automated system from the beginning of the processing of an order for a particular can of paint to the end thereof defined by the finished paint can product is achieved. Machines for the batching of coloring agents in a paint-batching process are known, and an example of such is disclosed in U.S. Pat. No. 4,705,083—Rossetti. In such a machine, the formula for the particular color of paint to be formed, via the dispensing process, is stored in a particular address of the computer system's memory, and by which the solenoid valves, or the like, of the machine are controlled for the automatic dispensing of a particular colorant or colorants used in the formation of the particular color of paint. Machines of this type are also manufactured by the Miller Paint Equipment Company of Addison, Ill., under the product name "ACCUTINTER." Both types of machines above-described dispense each colorant through a valve on a volume basis. Both types of machines also disclose a method for calibrating the machine during its initial inception, by measuring the weight thereof and adjusting the volumetric-flow dispensing of the colorant in accordance therewith, as compared to the nominal weight contained in a table, or the like. Such calibration via the weighing of a droplet thereof, as explained above, is done at the initial outset of the emplacement of the machine for calibrating purposes, and at regular intervals thereafter. These above-described prior art devices for the automatic dispensing and batching of paint into paint cans have no effective means for the quality-control checking of the dispensed liquid colorants, nor of the final paint can product. It has been known to weigh the final product in order to determine, in an approximate manner, whether or not the paint color therein actually lies within a broad range of resolutions indicative of the paint color so desired. Of course, such simple weighing of the final product is not very refined, often leads to acceptance of colors of paint cans which otherwise would be rejected were a more refined standard used, and, would also reject cans for which the color of the paint would be acceptable under a more refined method.

The present invention is also directed to the upstream and downstream processes of a paint can before and after reaching the machine for batching of coloring agents, as above described. Essentially, the present invention retains complete control and information on the formation of a paint can of a particular paint color from the beginning of the placement of an order for that particular color of paint, until the very end, where the paint can is mixed and sorted for subsequent location and storage of inventory, or the like. There are, of course, many types of automated processing systems by which a particular product may be dispensed and stored in a container, and subsequently conveyed to a warehouse, or the like. However, the present invention is uniquely directed and suited to a paint-batching process encompassing the entire cycle from the placement of the order for a particular color of paint can to the end, where the thus-formed paint can is ready to be packaged for shipment. Hitherto, very little control of the ordering of a particular paint color, and the formation thereof, has been carried out, and the only substantially complete automated system being that above-described for the formation of the particular paint color via the volumetric dispensing of the particular liquid colorants thereof into the container via the conventional paint-batching machine.

There is no presently available system by which, at the inception of the placement of an order for a particular color of paint, such order will thereafter automatically be coupled and linked along the entire manufacturing process to the particular paint can or cans being so formed by the automated apparatus for carrying out the batching of the liquid colorants, as well as to the final products' sortment for shipment, and the interrelated customer information associated therewith. The present invention achieves such a unified, centralized and automated production system completely tied to the initial placement of the order of paint cans, by the computer system's intercommunications with the automated paint-batching machine, the computer system's monitoring and controlling the complete operation thereof, as well as checking for quality control via a weight-loop quality-control check.

The present invention utilizes bar-code on each paint can, which bar-code is read at a multitude of stations by an optical scanner, the bar-code on each can indicating a specific dynamic relocatable memory of the computer system indicative of the particular formula of color for the paint to be dispensed, or its corrected formula, as well as other information concerning size of can, customer information, and the like, useful in inventory control. The use of bar-codes on containers in assembly processes has been known before. Examples of such are disclosed in U.S. Pat. No. 4,525,071, which discloses a batching process for the formation of batch blending operations for the manufacture of various products. The bar-code on each container indicates a particular batch formulation recipe for that particular carrier, which batch formulation recipe is stored in the computer system. However, this patent does not disclose specific use in the paint-batching environment, nor for the quality control of the dispensed liquid colorants of the paint.

SUMMARY OF THE INVENTION

It is the main objective of the present invention to provide an automated paint-batching system by which the automated control of the paint to be produced is achieved from the very beginning of the placement of an order for such paint, until the end thereof where the paint can is lidded and mixed and thereafter shipped to the customer.

It is an objective of the present invention to provide such an automated paint manufacturing system by which each can is suitable and particularly labeled with bar-code for the particular color of paint to be stored therein, which label uniquely defines the formula of the color.

It is another objective of the present invention to uniquely define each paint can by the color of the paint contents thereof to be dispensed therein, and also to provide unique information on the size of the paint can, type of paint, customer information, as well as other important inventory information.

It is yet another objective of the present invention to provide an automated paint-batching apparatus for coloring agents which is comprised of either one dispensing station or two dispensing stations. When two stations are used, the first one is a tint-station dispensing all of the liquid colorants thereof and some of the base for pre-wetting the paint can, and the second station thereof is a base-station for dispensing the remainder of the base into the can. If only one dispensing station is used, then all of the dispensings and other functions are carried out thereat.

It is still another objective of the present invention to provide quality control for checking the dispensing of the liquid colorants and base into the paint can at each of the first and second stations of the automated paint-batching machine, by which, after each dispensing of a colorant or base, such is checked by weight by a scale, in order to determine the correct dispensing of the particular colorant, to ensure that the final product is of the proper shade and color.

It is still another objective of the present invention to automatically reject a paint can not falling within the general quality-control guidelines so desired, as determined by the quality-control weighing thereof, and also to attempt to salvage a paint can during the batching of the colorants thereof if it has been determined that one of the colorants thereof has been dispensed in the improper amount, such salvaging being achieved—in the case of overdispensing—by the reformulation of the formula in the relocatable memory banks of the computer in order to change the subsequent dispensing of the additional liquid colorants for that particular paint can in order to cancel out the wrong dispensing of the error-detected dispensing of a particular colorant by which the quality-control weight-loop system of the present invention has detected an error. The reformulation is achieved by comparison with a standard formula constituting the average or mean values determinant of the standard colorant, as measured by a spectrophotometer.

It is also an objective of the present invention to provide an assembly of a multitude of automated paint-batching machines in combination with an assembly line for feeding paint cans to the multitude of parallel-arranged paint-batching machines, the computer system of the invention controlling the direction of each particular paint can along its assembly-line transportation, and the delivery of that particular paint can to a desired one of the multitude of paint-batching machines. The present invention is suitable for the batching of water-base paints, as well as oil-base paints.

It is also an objective of the present invention to calibrate the dispensing apparatus a plurality of times during the day utilizing the information generated by the quality-control weighing system of the invention.

According to the invention, each paint-batching machine of the system of the invention may comprise only one dispensing station if line speed permits, and in the preferred embodiment, the system of the invention is comprised of two dispensing stations: A first tint-station, where a small volumetric dispensing of the base, water-base or oil-base, of the paint is dispensed, in order to wet the bottom of the can, at which first station, thereafter, is dispensed all of the liquid colorants making up the formula of the paint can, and a second base-station at which the remainder of the base of the formula of the paint is dispensed. Each of the first and second stations of the paint-batching machine of the invention has operatively associated therewith a weighing platform upon which rests the paint can during the dispensing at the respective station. Each weighing platform incorporates at least one scale-head for weighing the paint can after each dispensing of colorant or base thereof for determining the proper amount of each colorant, for quality-control purposes. Each scale weighs the contents of the can after each dispensing, the reading thereof being compared with a nominal reading stored in the table of the computer of the system in order to determine the correct dispensing. Thus, according to the invention, there is volumetric dispensing of each ingredient of the paint being formed, while there is weight checking thereof for quality-control purposes. As such, those skilled in the art will recognize that by periodically weighing each of the dispensed ingredients and comparing the same to a predetermined standard, an inherent automatic and instantaneous calibration of the dipensed ingredients is provided which eliminates temperature control for specific gravity and viscosity variations in the dispensed ingredients. The weighing of each dispensing of an ingredient not only determines the quality control of the particular ingredient dispensed, but will also be used for determining whether such may be salvaged by changing the formula of the ingredients to be dispensed after the respective ingredient for which an error reading has been turned up, such weight checking also being used for rejecting a paint can if it is beyond salvaging, and also being used for indication of a malfunction in the particular paint-batching machine requiring immediate attention and shut down of the particular machine, as well as other functions. Each paint can which is to receive the dispensed liquid colorants from the particular paint-batching machine is uniquely labeled by bar-code thereon to indicate exactly what the particular color of the paint is to be. The bar-code is labeled and placed on the particular can via the computer operating system of the invention, which bar-code is formed by a conventional bar-code printer in response to the order received from a paint store and the like. The bar-code on the paint can represents the color of the paint in the computer system in which is stored the master formula for a particular color ordered, which master formula is self-adjustable for batch variations. The computer operating system also controls the guidance of the particular paint can along its assembly line transport, so that the paint can is designated to one of a plurality of paint-batching cells of the system of the invention, with the bar-code of the paint can being read at a plurality of stations along the entire manufacturing process.

BRIEF DESCRIPTION OF THE DRAWINGS

The invention will be more readily understood with reference to the accompanying drawings, wherein:

FIG. 4 is a top view, similar to FIG. 2, but showing the sequence of differently sized cans one stage-increment later with the optical bar-code rotating mechanism operatively engaged with a one-gallon paint can between the first and second stations of the machine;

FIG. 5 is a detailed view of the conveyer section between the optical bar-code reader and the second, base dispensing station of the machine, showing the guide-rails positioned in their closest relationship for the guidance of a one-gallon paint can;

DETAILED DESCRIPTION OF THE INVENTION

Figure 1:
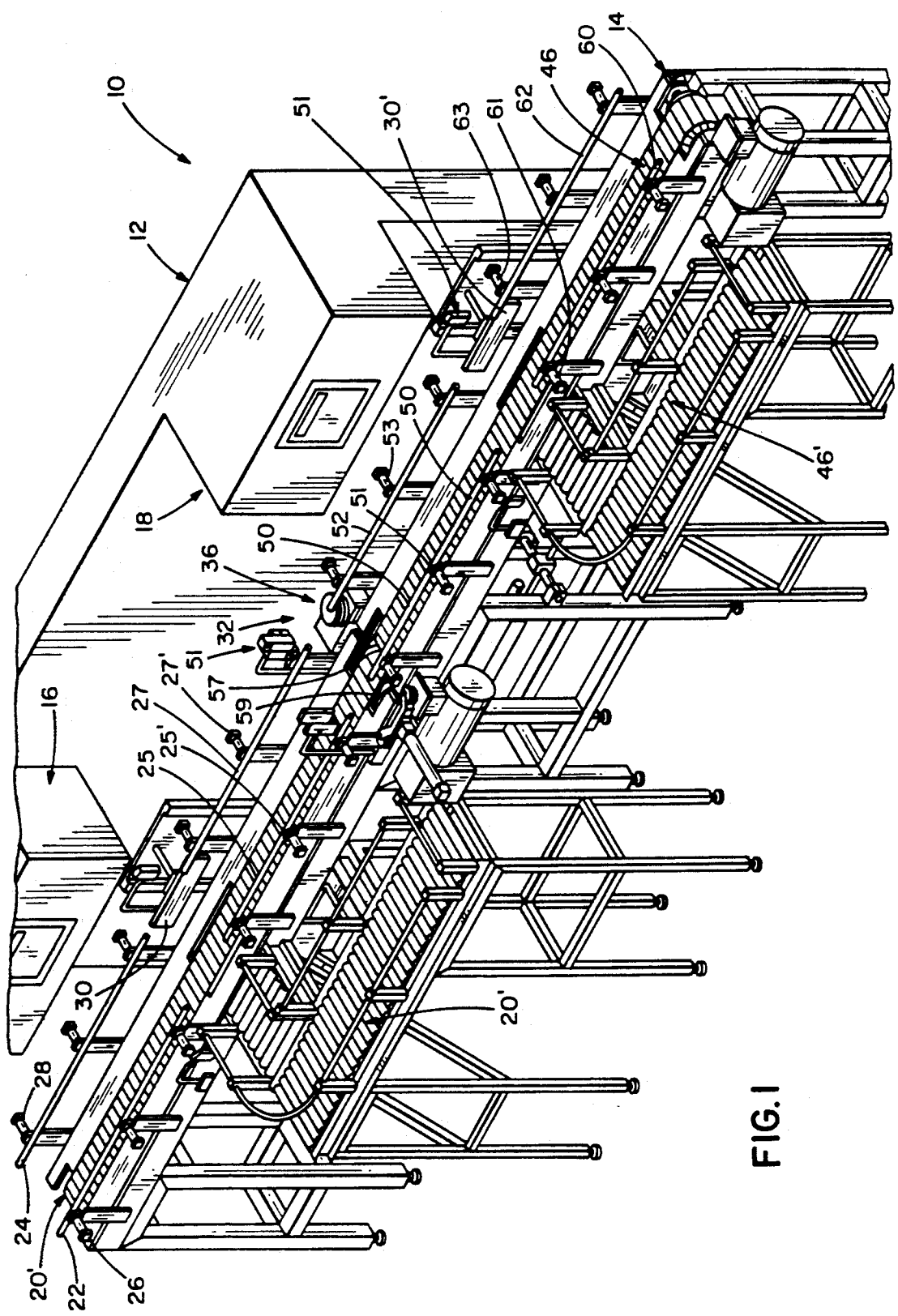
FIG. 1 is an isometric view of a paint-batching machine provided at each cell, of which according to the invention, there are a plurality, at which cell a paint can is transported and into which is dispensed the paint colorants and base constituting the formula of a particular color forming the paint to be stored in the paint can.
Figure 2:
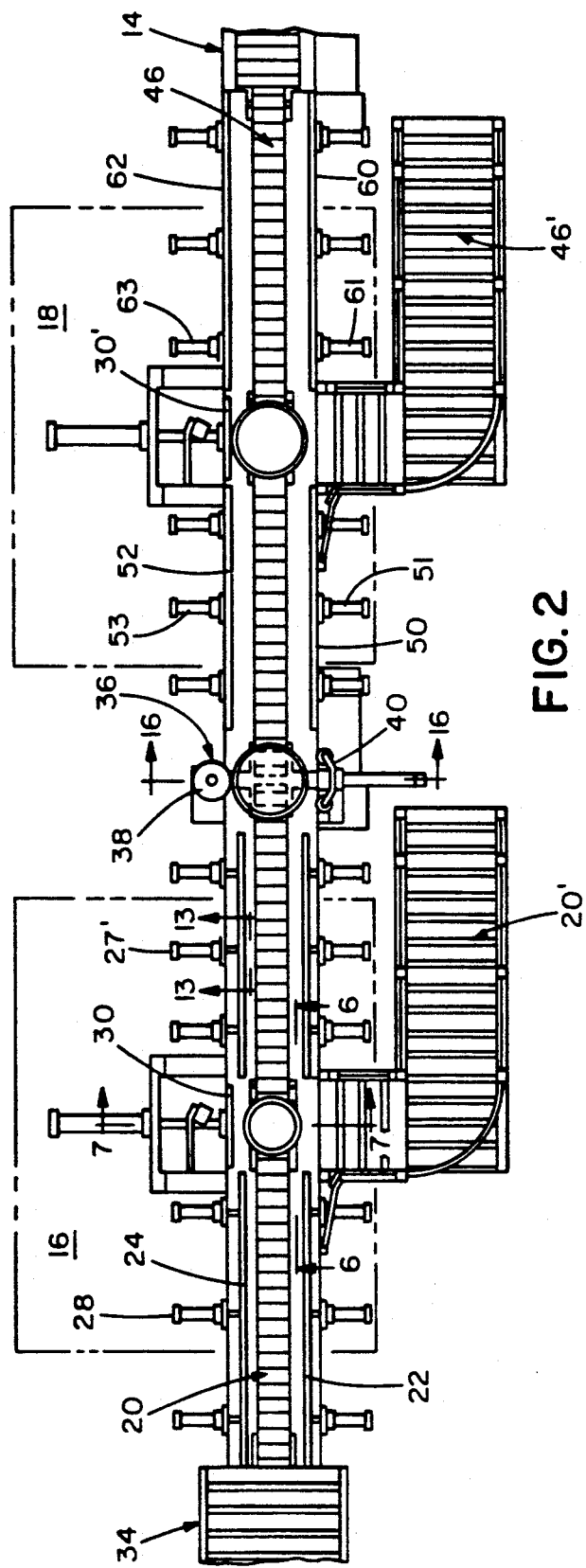
FIG. 2 is a top view thereof.
Figure 3:
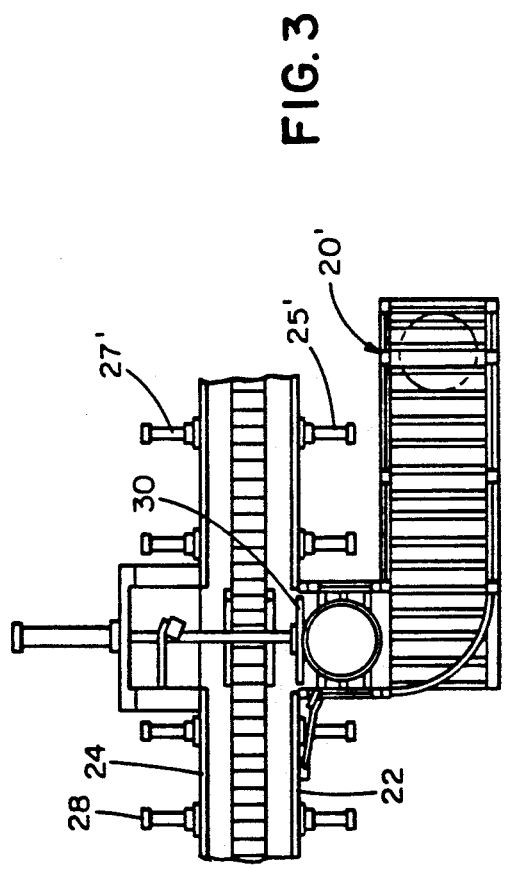
FIG. 3 is a detailed view of the reject-line of the conveyer system at the first, tint-station of the cell of FIG. 1.
Figure 6:
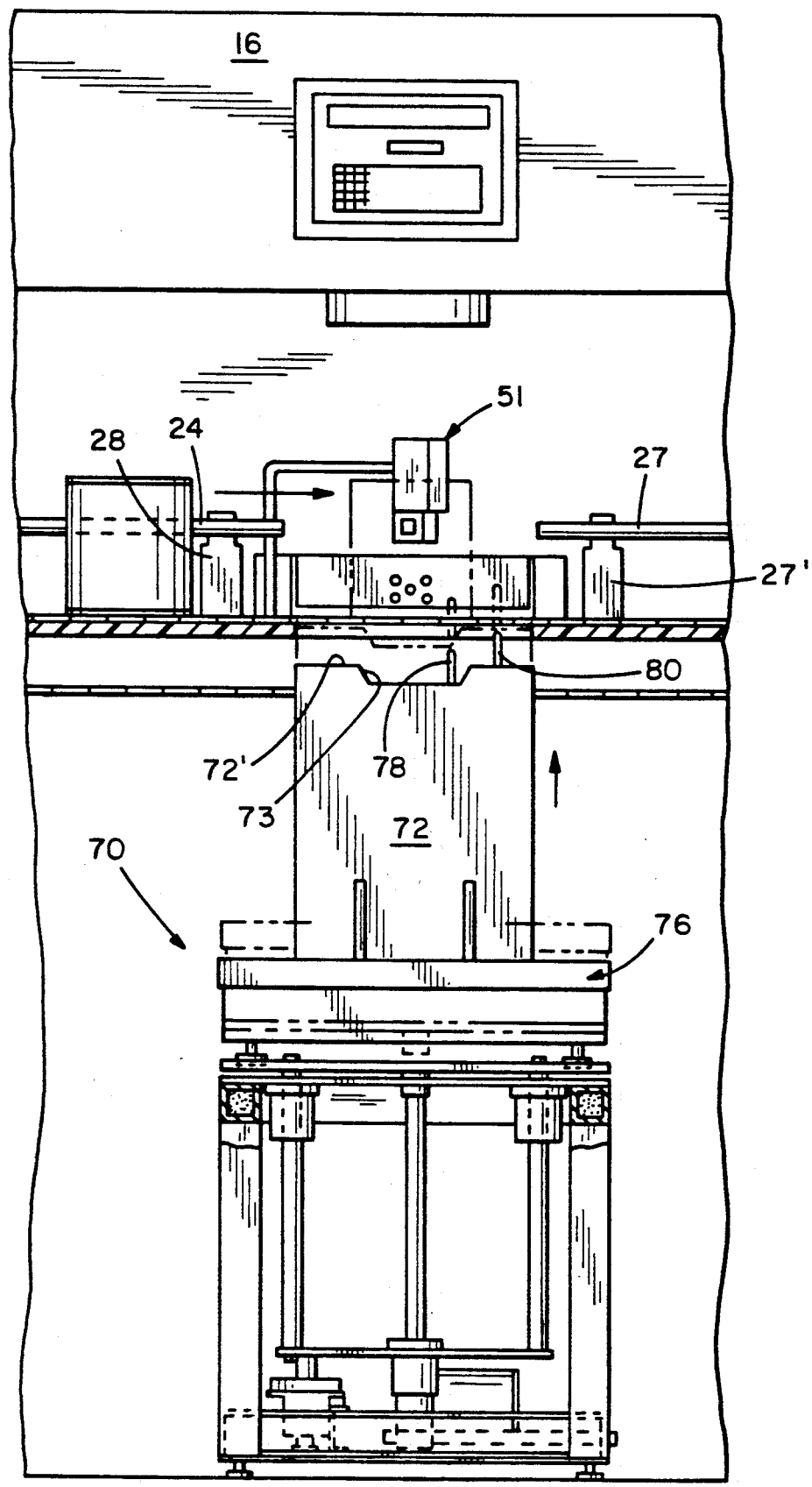
FIG. 6 is a cross-sectional view taken along line 6—6 of FIG. 2.
Figure 7:
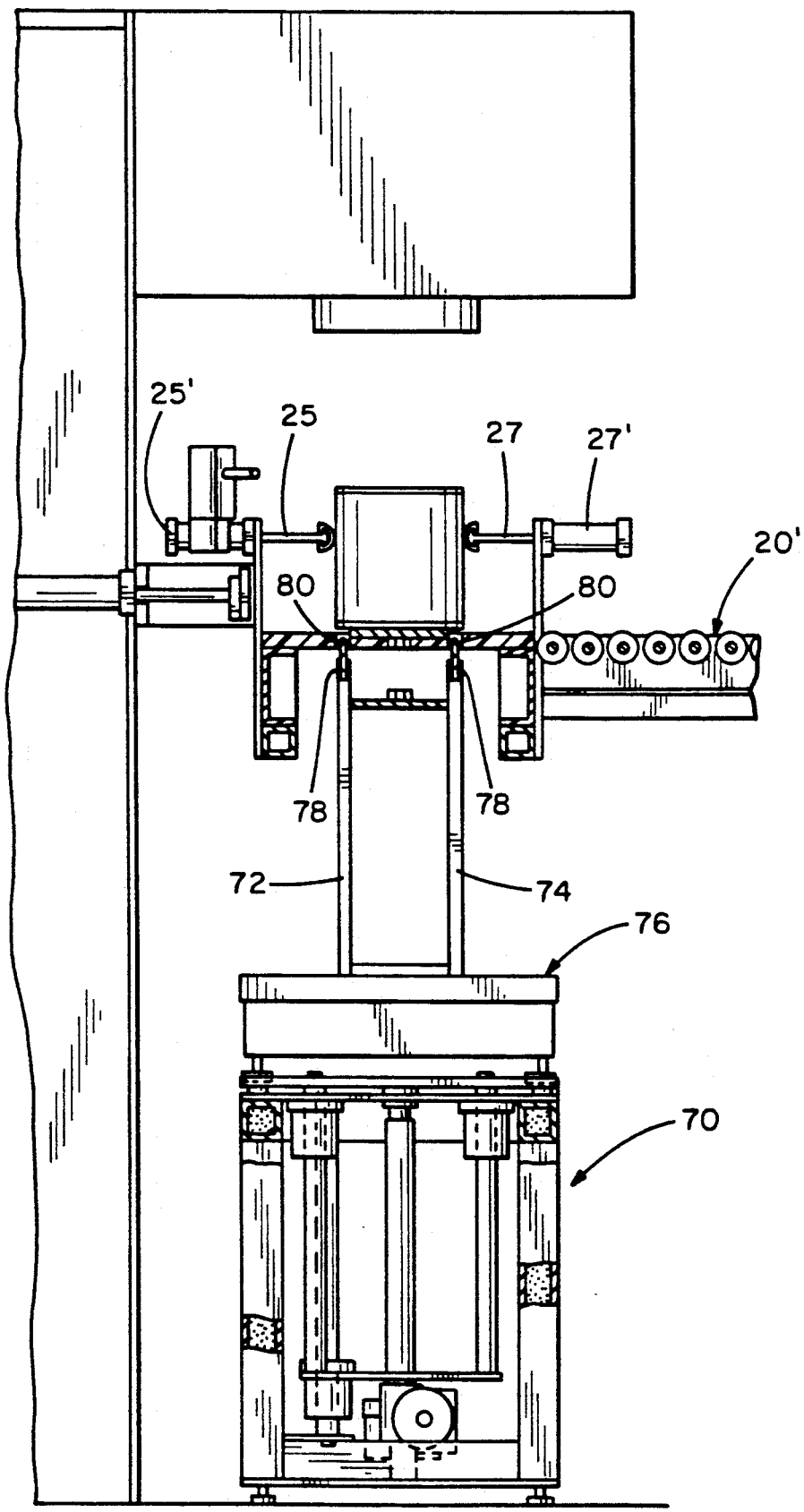
FIG. 7 is a cross-sectional view taken along line 7—7 of FIG. 2.
Figure 8:
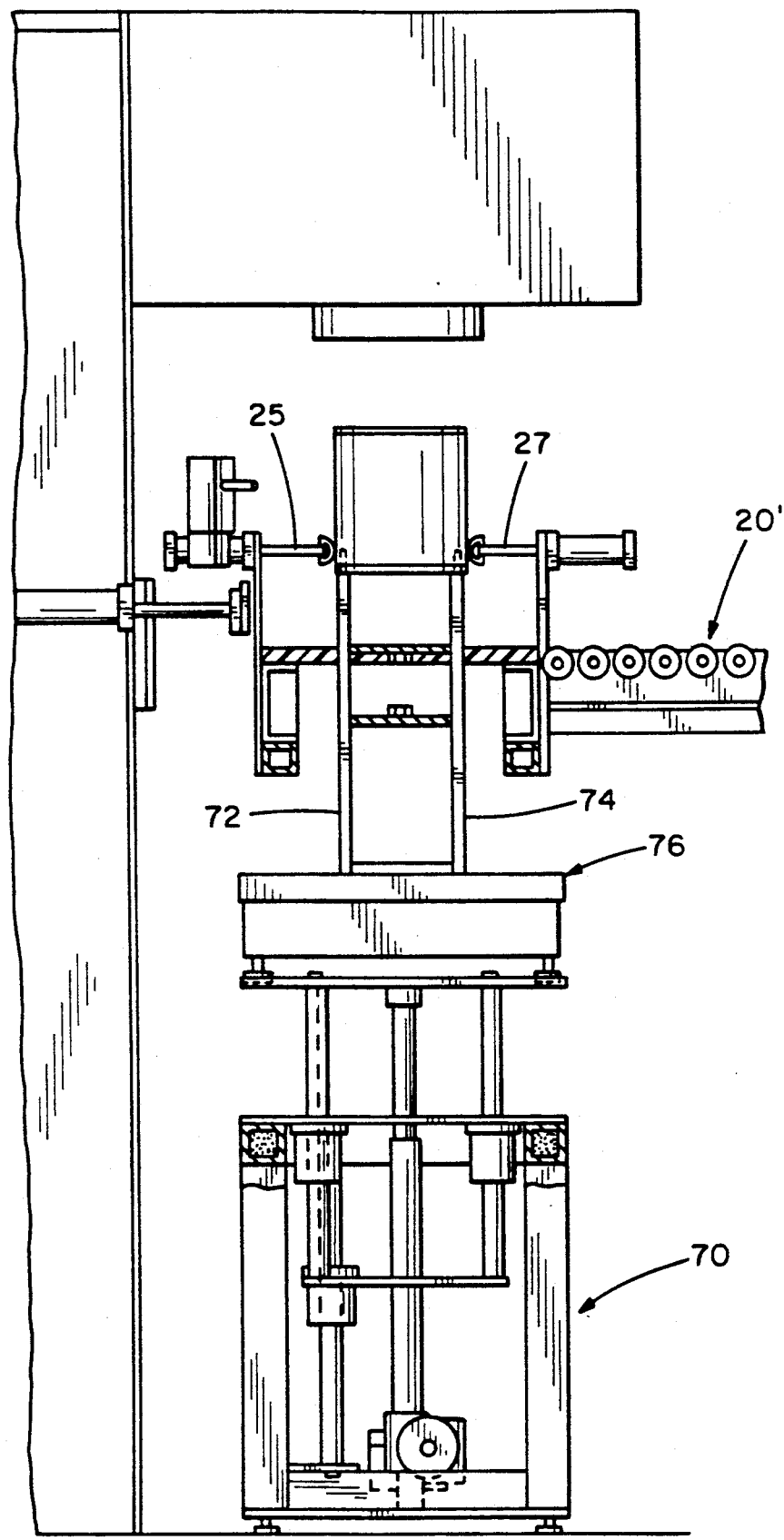
FIG. 8 is a view similar to FIG. 7, showing the weighing platform of the first, tint-station raised with a can thereon during the dispensing at the first station.

Referring now to the drawings in greater detail, there is shown in FIG. 1 the paint-batching machine or apparatus constituting part of each cell of the assembly of the present invention. Each machine 10 has a paint coloring agent batching and dispensing apparatus 12 operatively associated with a conveyer system 14 for transporting empty paint cans through the paint-batching machine in order to dispense the coloring agents and base(s) into the paint can. Referring to FIGS. 1 through 5, for now, the paint-batching apparatus 12 is an improved version of the paint-batching and dispensing machine produced by Miller Paint Equipment Company of Addison, Ill., which machine is generally referred to as "ACCUTINTER." Such "ACCUTINTER" machine is conventionally provided with only one dispensing station, and it is computer-controlled in that all of the formulae representing the final paint colors are stored in relocatable memory of the computer, whereby by accessing any particular address of the computer memory representing the particular color or paint one desires, the "ACCUTINTER" will automatically dispense the proper amount of colorants and base to achieve such color. The "ACCUTINTER" of Miller Paint Equipment Company of Addison, Ill. has been improved for the system of the present invention, one of which improvements is as shown in FIGS. 1-5, where there are provided two dispensing stations indicated generally by reference numerals 16 and 18 although it is to be understood that just one dispensing station may be used in the present system if line-speed is not critical. The first dispensing station 16 stores therein the various containers of coloring agents or liquid colorants, typically used and conventional in the paint manufacturing art. In the preferred embodiment, the first station includes 20 containers, each container having a volume of 5 gallons, with the corresponding number of dispensing nozzles associated therewith in the conventional manner. This first station 16, as mentioned, dispenses all of the colorants to be used in any particular color formula. The second dispensing station 18 is used for dispensing the liquid base, whether it be water-base paint, or oil-base paint, and, in the preferred embodiment, the second dispensing station 18 includes 8 fifteen-gallon tanks. According to the present invention, there is also provided a feeding conduit between the second dispensing station 18 and the first dispensing station 16 in order to couple the liquid base material in the second dispensing station 18 to the first dispensing station 16, so that, before any of the colorants at the first dispensing station 16 is dispensed, a first coating of liquid base is dispensed, in order to wet the bottom of the can, in order to prevent any adhesion of the liquid colorant to the paint can proper, which, if occurred, could prevent a proper and thorough mixing of the colorants with the base. The amount of initial dispensing of the base at the first dispensing station 16 may vary, but will only be a small percentage of the total base constituting the entire base of the finished product. However, enough base must be dispensed in order to wet the bottom of the can and also a small portion of the vertical interior side wall in order to prevent such adhesion above referred to. The first dispensing station 16 will have its own dispensing nozzle associated with the dispensing of the liquid base thereat, and, of course, will have its own solenoid valve and computer control associated therewith. This interconnection between the second dispensing station 18 and the first dispensing station 16 is shown schematically in FIG. 28, with the dispensing structure, including the pumps and motors of the second dispensing station 18, achieving the wet-dispensing at the first dispensing station, all of which are controlled by the computer system of the present invention to be described below in greater detail. Thus, the first tint-dispensing station will dispense enough of the base to wet the bottom of the can, and, thereafter the colorants required for the particular formula of the color to be formed. After all of the colorants have been dispensed at the first dispensing station 16, the paint can is sent to the second dispensing station 18, at which the rest of the liquid base is dispensed thereat, to thus finish the dispensing process of the particular formula being dispensed. After the liquid base has been dispensed in its entirety at the second dispensing station 18, the paint can is then conveyed to a conventional lidder, and, thereafter to a conventional paint mixing machine where the contents of the can are thoroughly mixed, all of which operations are controlled by the central processing computer of the invention, to be described below in greater detail. There is at least one separate mixer for one-gallon cans, and at least one mixer for five-gallon cans. The use of a first and second dispensing station 16, 18, not only is useful in speeding up the automated process, but also allows for the segregated, quality-control weighing of the dispensed liquids according to the invention, to be described below in greater detail. Suffice it for now to say that by having two dispensing stations, one is allowed to use at the first dispensing station a weighing mechanism that provides a much more refined resolution, in accordance with the fact that the amount of liquid colorants dispensed are of a much smaller magnitude as compared to the liquid base dispensed. In the preferred form of the invention, at the first dispensing station 16, as will be described below in greater detail, the weighing apparatus, which includes thereat a vertically movable platform, is divided into two weighing heads, so as to differentiate between resolutions of 1/100th of a gram and 1/10th of a gram, the amount of liquid colorant dispensed less than 6.8 grams being connected to the weighing head having a resolution of 1/100th of a gram, while any liquid colorant dispensed of 6.8 grams or more being coupled to the weighing head of 1/10th of a gram resolution, it being understood that such connection being controlled via the central computer processing unit of the invention, to be described below in greater detail. It is also, of course, understood that the amount of base dispensed at the first tint-dispensing station 16, in order to wet the bottom of the can, will also be controlled by the weighing apparatus at the first dispensing station, and typically will be controlled by the 1/10th gram resolution weighing head of the weighing apparatus thereat, since, typically, such wetting base will be dispensed in excess of 6.8 grams. At the second dispensing station 18, where, of course, much larger amounts of liquid base are dispensed, the resolution requirements are less restrictive as required at the first dispensing station, and, therefore, the second dispensing station has a weighing apparatus with associated vertically movable weighing platform, to be described below in greater detail, having a resolution of 1 gram. Thus, the provision of two dispensing stations 16 and 18 ideally provides for the segregation of the main tolerances required of the weighing apparatuses of the invention for measuring the dispensings of the liquid colorants and liquid base for purposes of quality control, all of which will be described along greater detail in conjunction with the flow charts, the weights weighed by the weighing mechanisms of the invention being used for comparison with the nominal weights stored in the table of such a processing unit of the invention for comparisons therewith to determine proper amounts, etc., as well as for updating liquid supply-levels at each station.

The conveyer system 14 of each cell 10 comprises a first entrance section 20, which conveys a can to the first tint-dispensing station 16 for the dispensing of the wetting liquid base and all the colorants of the particular formula. The conveyer section 20 has operatively associated therewith a first pair of adjustable side rails 22, 24 which, in the preferred embodiment, may take either one of two positions: A first position more narrowly spaced together, in order to accommodate one-gallon paint cans, and a second position spaced farther apart, in order to accommodate five-gallon paint cans. The rails 22 and 24 are movable via a plurality of piston cylinders 26, 28, the operations of which are controlled by the central processing unit of the invention. The conveyer 20 transports each paint can to the first dispensing station 16 to a position under the dispensing nozzles thereof, until the paint can rests upon the weighing platform of the weighing mechanism of the invention for the quality control thereof, which will be described below in greater detail in conjunction with FIGS. 6–12. It is noted that prior to entering conveyer 20, the bar-code on the bottom of the can is read, which constitutes the second bar-code reading thereof along the entire conveyance of the can, from empty-can inventory to final-can palletizing (see FIG. 30A, reference numeral 838, described below). At the first dispensing station, the platform of the weighing apparatus of the quality-control system of the invention lifts the paint can upwardly so as to be elevated above the horizontal plane of the conveyer 20, and the can is tared, after which the liquid colorants and the wetting liquid base are dispensed thereat. An angularly-offset conveyer 20' is also provided, which conveyer 20' defines an inlet opening juxtapositioned adjacent the weighing platform at the first dispensing station, which conveyor 20' is the reject-conveyer—a paint can which is determined to be of poor quality is pushed thereon for subsequent disposing thereof as a rejected can, such pushing of the paint can onto the conveyer 20' being accomplished via a push rod 30 controlled by a conventional piston and cylinder, which of course is also controlled via the central processing control system of the present invention, it being understood, of course, that the push rod 30 will not push the can onto the reject conveyer 20' until after the weighing platform of the quality-control weighing mechanism of the invention has first been lowered, so as to be below the conveyer 20. After the dispensing of all the required colorants and wetting liquid base at the first dispensing station 16, the first conveyer 20 will, thereafter, convey the partially-filled paint can toward the second, base-dispensing station 18, and, specifically, to an intermediate position indicated generally by reference number 32, at which there is provided a can-rotating mechanism for rotating the can in order for the bar-code on the bottom of the can to be read by a conventional optical bar-code scanner positioned thereunder. The bar-code on the paint can includes the necessary information regarding the second portion of the particular formula of the color to be formed of the paint, which formula is stored by the computer system of the invention, the station 32 constituting the third optical reading of the very same bar-code on that paint can, there being two previous optical readings, one at the storage assembly of empty paint cans in inventory, which will be described below in greater detail when describing the entire operating system incorporating many cells, and a second optical reading carried out at the beginning of the entry of each paint can into a particular cell 10, which optical reading is carried out at the entrance of the paint can onto the conveyer 20, which optical reading is indicated generally by reference number 34 in FIG. 2, as described above. It is understood, of course, that the particular manner by which the bar-code is read and the optical scanner used may be those conventionally employed and well-known.

Figure 16:
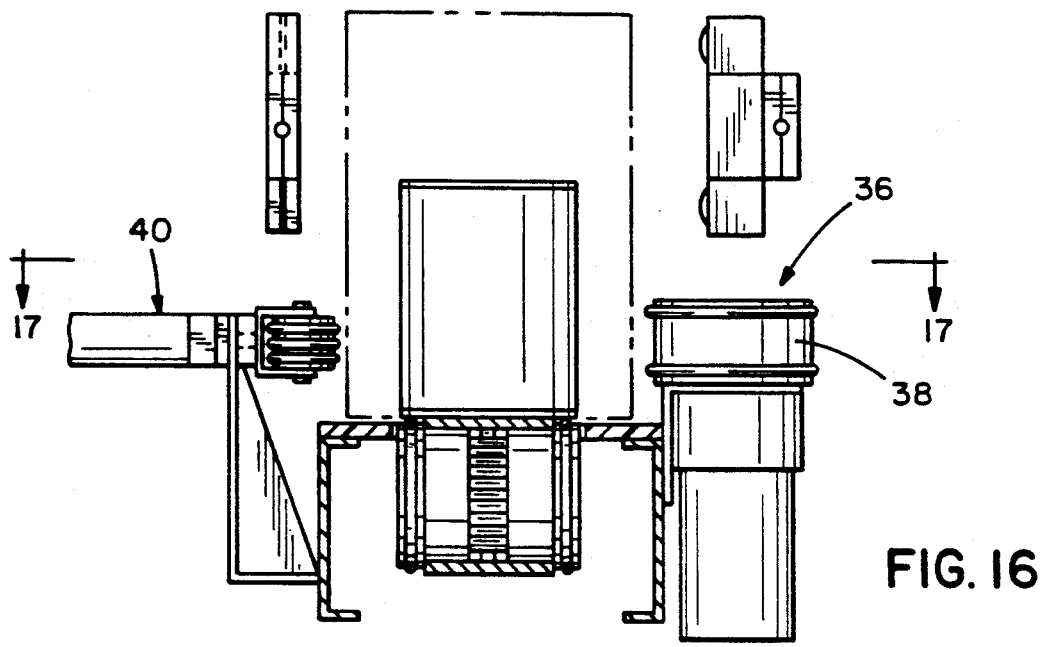
FIG. 16 is a cross-sectional view taken along line 16—16 of FIG. 2, showing the paint-can rotating mechanism intermediate between the first and second dispensing stations for achieving a reading of the bar-code on the bottom surface of the paint can.
Figure 17:
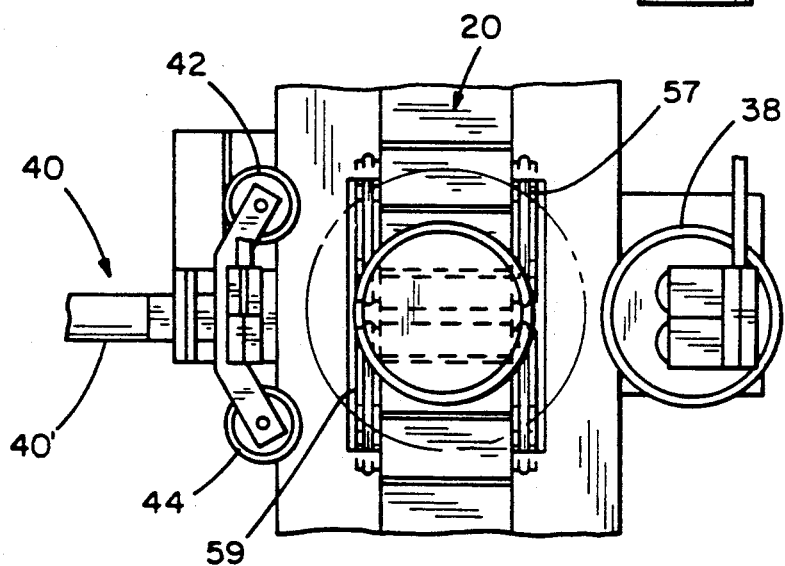
FIG. 17 is a cross-sectional view taken along line 17—17 of FIG. 16.
Figure 18:
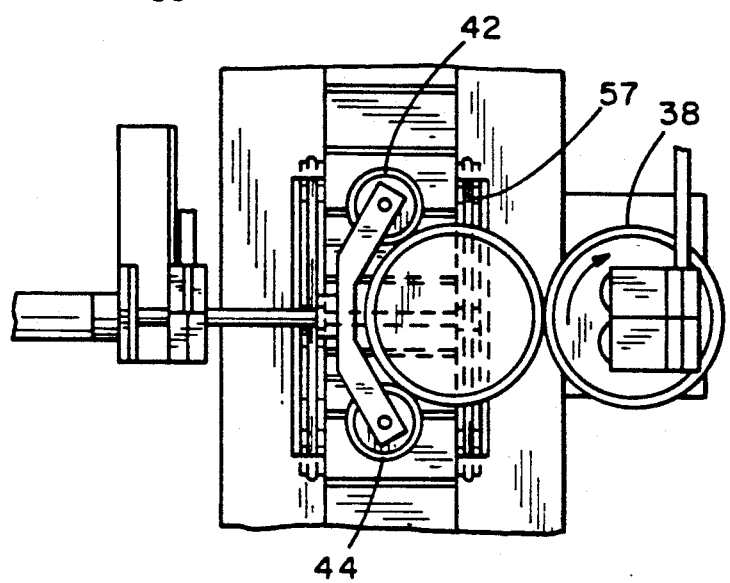
FIG. 18 is a view similar to FIG. 17, but showing the paint can rotating mechanism in its paint can engaging state for rotating the paint can during the optical reading of the bar-code via the intermediate scanner between the first and second dispensing stations of the cell.

In the preferred embodiment, according to the invention, each can is caused to be rotated in order that a stationary optical bar-code scanner may be used, such rotation of the paint can being achieved by, for example, that shown in FIGS. 1, 2, 4, 5 and 16-18. FIGS. 16-18 show more detailed views of the means by which the paint can may be rotated for allowing the optical reading of the bar-code thereof, such paint-can rotating mechanism being indicated generally by reference numeral 36 in FIGS. 16. The can-rotating mechanism 36 includes a first driven roller 38 rotatable in a horizontal plane, and positioned on the rearward portion of the conveying system, and a bifurcated idle-roller mechanism 40 defining a pair of idle-rollers 42, 44, also rotatable in a horizontal plane and movable toward and away from the conveying system via a piston 40′, such that rearward movement of the bifurcated roller assembly 40 will urge the paint can towards the rear roller 38, and cause the rotation thereof during the driven rotation of the rear roller 38, as shown in FIGS. 16-18. The bar-code on the bottom of the paint can will, thereafter, be read by an optical bar-code reader of conventional design positioned below the station 32. After the reading of the bar-code, and the transmittal of the information thereon to the central processing unit, the paint can is conveyed along a second conveyer belt 46 to the second dispensing station 18. It is noted that in the preferred embodiment, the driven roller 38 is stationarily mounted, with the bifurcated roller mechanism 44 urging the paint can rearwardly toward engagement with the driven roller 38, as above described. Of course, it is possible to allow for the simultaneous forward movement of the driven roller 38 along with the rearward movement of the bifurcated roller mechanism 40, whereby any rearward movement of the paint can would be obviated. However, in the preferred embodiment, when there is rearward movement imparted to the paint can, in the case of a one-gallon paint can, the adjustable side rails 50, 52 operatively associated with the second conveyor belt 46, at the forward portion thereof, is allowed to remain in the most spaced-apart state for accomodating the five-gallon can, even when the one-gallon can is being conveyed, so that the rearwardly-pushed can during the optical reading at the station 32 will be allowed easy re-entry back onto the conveying system and the conveyer 46 after the reading of the can. For the case of the one-gallon can, after initial movement from the station 32 onto the conveyer 46, the side rails 50 and 52 may thereafter be adjusted to the one-gallon size after proper entry of the optically ready paint can onto the belt 46 through a simple time delay. For a five-gallon paint can, no adjustment is necessary, since the roller 38 is designed for accommodating a five-gallon can, so that, upon the rearward movement of the bifurcated roller mechanism 40 toward the driven roller 38, substantially no rearward movement of the paint can is caused, so that the five-gallon paint can substantially stays centered on the second conveyer belt by guide rails 50, 51. A pair of small connecting drive-belts 57, 59 are also provided for bridging the gap between the rear end of conveyer 20 and the forward end of conveyer 46, at the station 32, in order to allow for a smooth and assured transfer of the paint can. The side rails 50 and 52 are moved toward and away from each other by conventional piston-cylinders 51′, 53′, similar to the piston-cylinder arrangement 26 and 28, all of which are also controlled by the central processing unit of the invention. The side rails 50 and 52 are independent of the positioning of the rear guide rails 25 and 27 of the forward conveyer 20, which are also independent of the operation of the forward rails 22 and 24. Conveyers 20 and 46 are rotated simultaneously, and operate as one unit together for conveying the cans therealong in increments. The conveyer 46 is spaced from the conveyer 20 at the station 32 in order to allow for a space therebetween through which the conventional optical bar-code scanner may read the bar-code on the bottom of the paint can. Each of the respective locations at which a paint can is acted upon, such as at the first dispensing station 16, station 32, and the second dispensing station 18, there are provided conventional photodetecting cells 51 for sensing the can thereat and for controlling the movement of the conveyers 20 and 46, until the particular operation at that site is achieved, which is well-known. Thus, the conveyers 20 and 46 are incremented after the completion of each step at the particular location at which the can is acted upon. During conveyance of the particular paint can, the respective pair of side rails through which the particular paint can is being transported is adjusted to suit a one or five-gallon paint can. After being transported from the reading station 32, the paint can is sent to the second, base-dispensing station 18 where the remainder of the liquid base is dispensed, and, thereafter, along the remainder of the conveyer 46, between the guide rails 60 and 62, which are controlled by piston-cylinders 61, 63 to accommodate a one or five-gallon paint can, after which the paint can is transported to a conventional lidding mechanism where the lid is put on the paint can, sealed, and, thereafter, the paint can is transported to a conventional paint mixing apparatus for the thorough mixing of the paint can. The conveyer 46 also includes a branch 46′ similar to the branch 20′ for receiving a rejected can pushed thereon via the pusher plate 30′. It is also noted that the length of each conveyer-section between operations is identical for increasing productivity. Thus, the length of conveyer 20 is equal to the length of conveyer 46, and the distance from station 16, where the colorants are disposed, to the station 32 is equal to the distance from the station 32 to the station 18 where the base is dispensed. Thus, that length is the same as the distance of each incremental advance of the conveyer 14, so that multiple operations are carried out at the same time after each incremental advance of the paint cans.

Figure 9:
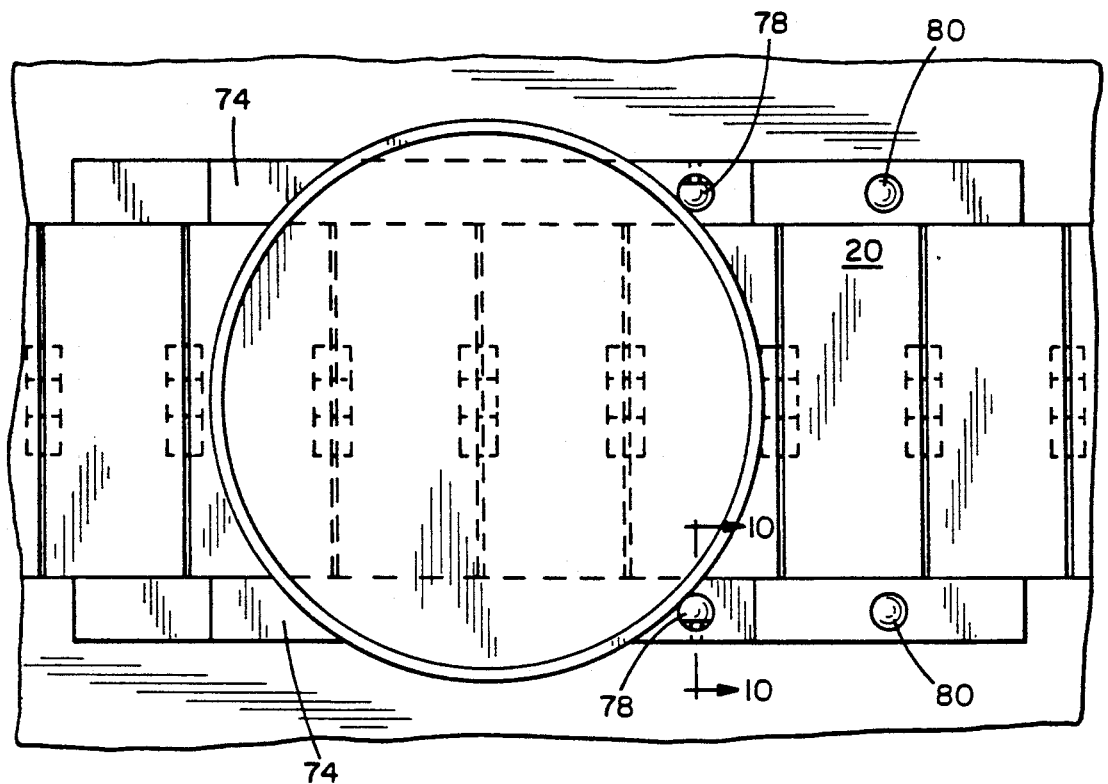
FIG. 9 is a top detail view of the first dispensing station of the cell, in which the weighing platform thereof is in its raised position holding a one-gallon can thereon.
Figure 10:
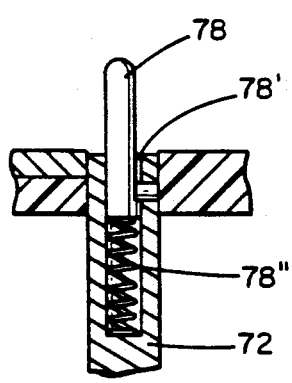
FIG. 10 is a cross-sectional view taken along line 10—10 of FIG. 9 showing one of the inner spring-biased retaining pins of the weighing platform.
Figure 11:
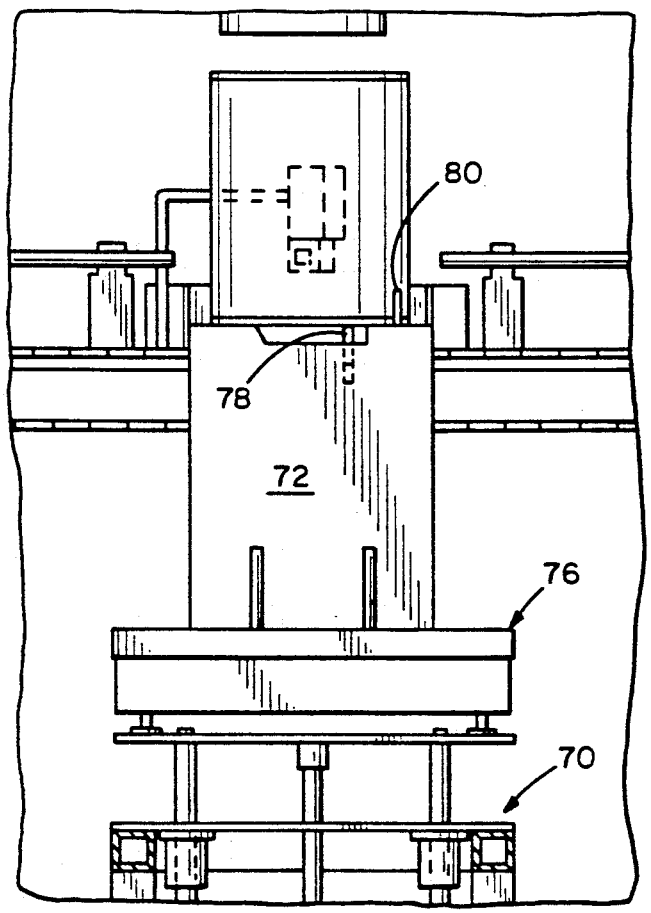
FIG. 11 is a view similar to FIG. 6, but showing the weighing platform of the first station in its raised position supporting thereon a five-gallon can, which five-gallon can is retained via the exterior pins of the upper surface of the weighing platform.
Figure 12:
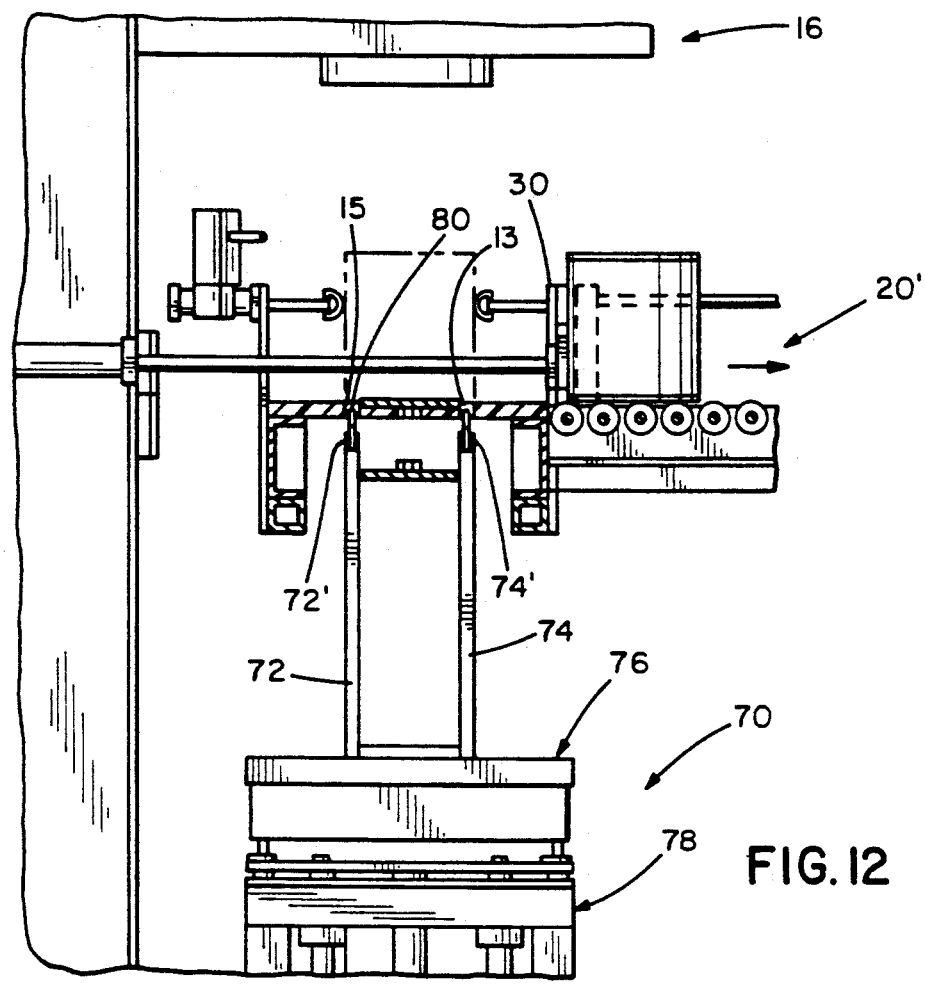
FIG. 12 is a view similar to FIG. 8, showing the weighing platform in its lowered position and the paint can previously supported thereon pushed onto the reject conveyer section, with the weighing platform ready for the reception of another one-gallon or five-gallon paint can thereon.
Figure 13:
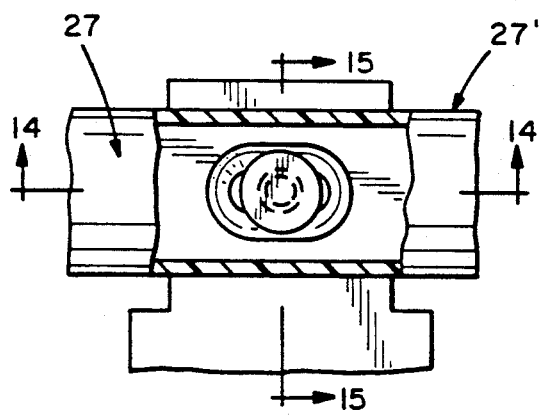
FIG. 13 is a cross-sectional view taken along line 13—13 of FIG. 2, showing the details of the side rail of the conveyer system of each station.
Figure 14:
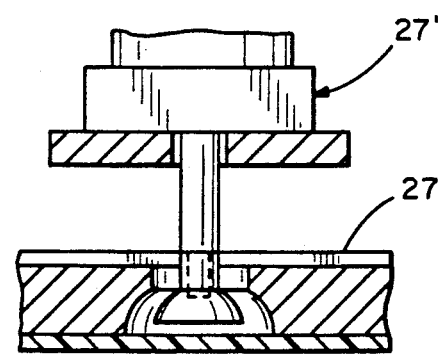
FIG. 14 is a cross-sectional view taken along line 14—14 of FIG. 13.
Figure 15:
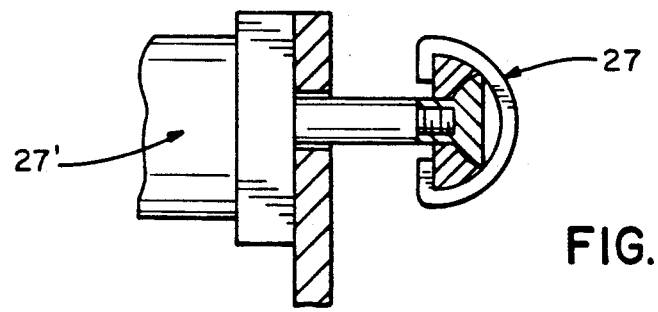
FIG. 15 is a cross-sectional view taken along line 15—15 of FIG. 13.

Referring now to FIGS. 6-12, there is shown the weighing scale apparatus used at the first dispensing station, it being understood that identical structure is used at the second dispensing station. The weighing mechanism, indicated generally by reference numeral 70, is made up of a pair of vertically-oriented side plates 72, 74, seen in FIG. 12, the lower ends of which are affixed to a movable mounting block 76, which block 76 is reciprocal in the vertical direction via a cylinder piston arrangement 77. A weighting scale suitable with the present invention may be that manufactured by the Mettler Corporation, Model EB60 -MC2 for the first dispensing station, which scale has a resolution of 1/100 th of a gram, and product EB16 for the second dispensing station, which scale has a resolution of 1 gram. Each side plate 72, 74 defines an upper edge surface 72' and 74' which contacts the lower peripheral portions of the bottom of the paint can for the lifting thereof when said mounting block is elevated via the piston. Each upper surface 72' and 74' defines a lower recessed central portion 73 thereof, as clearly shown in FIG. 6, with each surface 72' and 74' also mounting a pair of limit pins 78, 80, against which a paint can abuts. The pair of pins 78, one on each upper surface 72' and 74', is used for the abutment thereagainst of a one-gallon paint can during the conveying thereof, while the pair of pins 80, one for each of the upper surfaces 72' and 74', are used for abutment thereagainst of a five-gallon paint can. The pins 78 project from the lower recessed central portion 73 of the respective upper edge surface of the plate, with each pin 78, 80 being substantially the same height, the pins 78 not necessarily having to project upwardly as great a distance beyond the conveying belt associated at the first dispensing station, but only enough to accomodate the lower height of the one-gallon paint can. In addition, each of the stop-pins 78, as shown in FIG. 10, are reciprocal within a channel 78' formed in the respective plate 72, 74, which pin 78 is spring-biased via a spring 78" in the upward direction into its position for stopping a one-gallon paint can. When the piston-cylinder 78 is in its deactuated state, both of the pins 78 and 80 of each of the side plates 72, 74 are in their retracted, or lowered, state, where they do not project upwardly beyond the plane of the conveyer 20. When the piston-cylinder 78 is actuated, the side plates 72 and 74 are projected upwardly and through slots 13 and 15 at the first dispensing station, as best seen in FIG. 1, which slots 13 and 15 are of a length slightly greater than the width of the side plates 72, 74, and which slots are positioned on each lateral side of the conveyer 20 at the first dispensing station. Owing to the fact that the conveyer 20 is of a width which is less than the width of the smaller container to be transported —the one-gallon paint cans— there will be peripheral portions of the bottom of the paint can projecting laterally outwardly beyond the edges of the conveyer 20, which laterally outwardly projecting peripheral portions are those which are engaged by the upper edge surfaces 72', 74' of the side plates 72 and 74. When a five-gallon paint can is delivered to the first dispensing station, and stationarily positioned thereat, when the side plates 72 and 74 are raised to lift the can upwardly and out of contact with the conveyer 20, the five-gallon can will be positioned against the pair of stops 80, with the pair of pins 78 being positioned below the paint can and caused to be retracted into the channel 78' of the respective side plates 72, 74, by the weight of the can itself. When a one-gallon can is transported and stationarily positioned at the first dispensing station, the pins 78 are allowed to be projected outwardly via the springs 78", with the one-gallon paint can abutting thereagainst. During the entire dispensing at the first dispensing station 16, the paint can, whether a one-gallon or five-gallon, is in its raised or elevated position on the upper edge surfaces 72', 74' of the side plates 72 and 74, in order that, after each dispensing of the wetting liquid base, or after each dispensing of a liquid colorant, such dispensing is weighed via the weighing mechanism 70 for quality-control purposes, as described below in greater detail. FIG. 11 shows a five-gallon paint can in its elevated position during dispensing, with the pins 78 in their retracted or downward-most states, while FIG. 9 shows a one-gallon can being dispensed and supported on the upper-edge surfaces 72', 74' of the weighing mechanism 70 and retained from any further lateral movement via the pins 78.

Figure 30A:
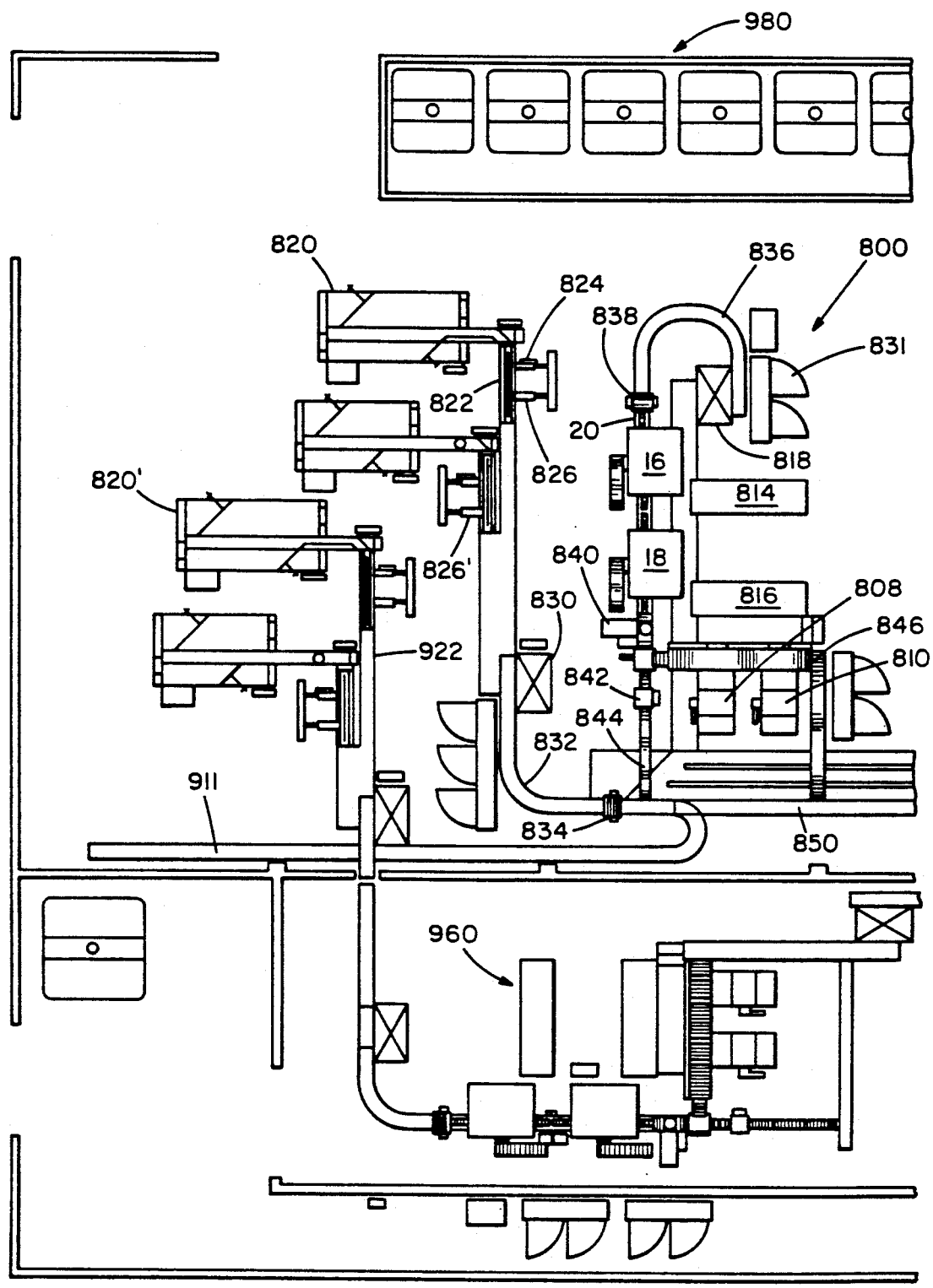
FIGS. 30A and 30B are plan views of an automated plant incorporating a plurality of paint-batching cells according to the invention, incorporating a plurality of parallel cells for water-base processing, and one, isolated cell for oil-base processing.
Figure 30B:
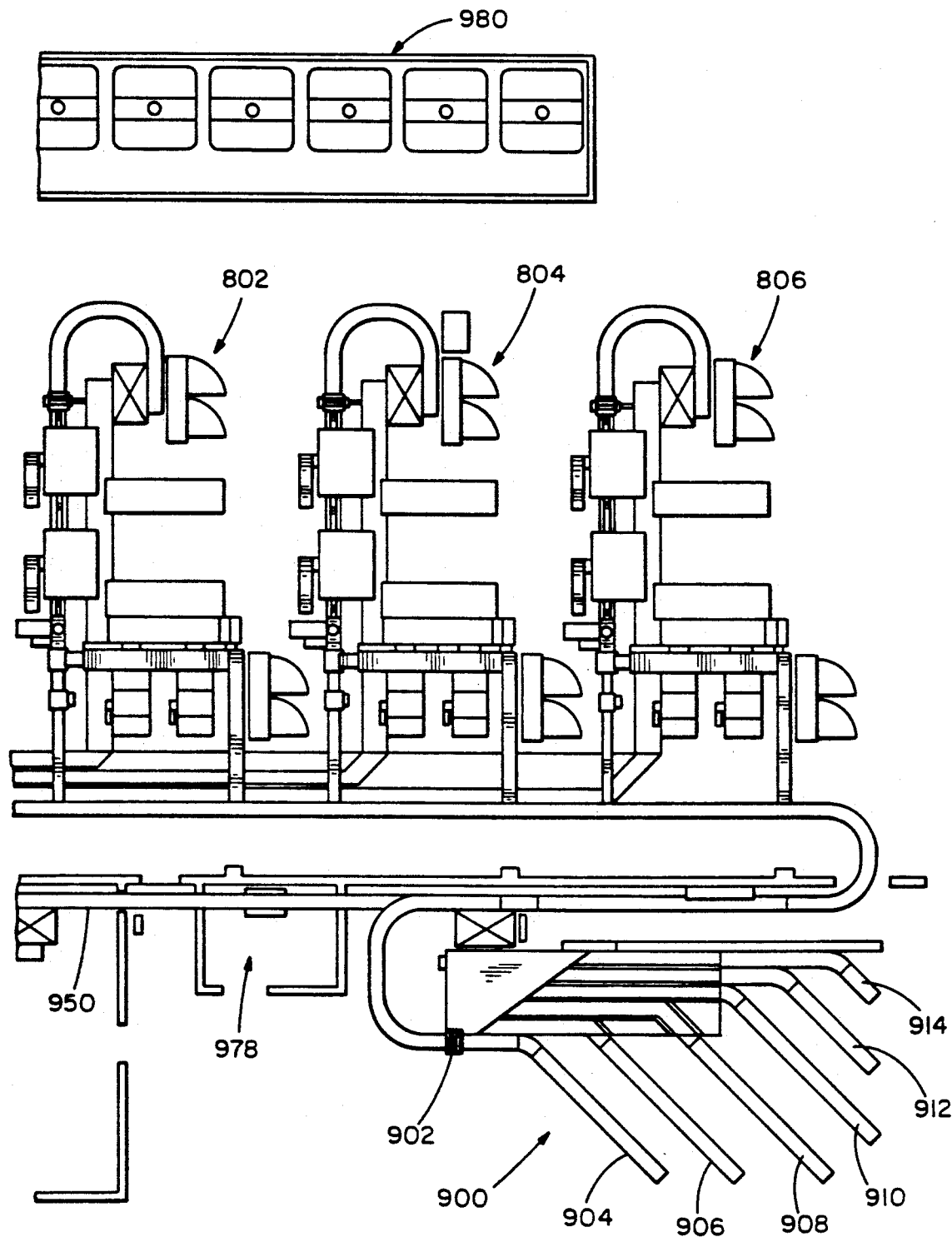

The present invention envisions the use of a plurality of cells of paint-batching apparatuses or "ACCUTINTERS" 10 arranged in parallel in an assembly-line process, whereby a plurality of lines of paint-batching cells are provided. Each paint-batching machines and cell is identical in operation, as above-described. Such an assembly of cells is shown in FIGS. 30A and 30B, and will be described below in greater detail. As mentioned above, the entire system is computer controlled, and such computer-controlled system can be broken down into basically four hierarchal operating levels: The highest order, the order-receiving and inventory-control computer system, such as that developed by SUN Manufacturing Company, hitherto referred to in the instant application as the SUN System, which system couples the central processing of the company to the various outlet and retail stores where orders for paints are initiated, the SUN System receiving these orders and developing them and conveying such information to the next level of the computer control system, which actually controls the operation of cells. The next level system is a VME, or "Versatile Modular Europa", which is a backplane modular coupling system for expansion cards, which is commercially available. The VME receives all information from the SUN System relating to orders, etc. and also communicates back to the SUN System on all processed cans, as well as those requiring rescheduling or the like. The third, middle level is the system PLC (Programmable Logic Circuitry) which communicates with the VME and controls the operations of the conveyer system proper outside of cell-sites. This level controls the conveyer system from the accumulator area, where empty paint cans are stored for subsequent use, to the cell-site area, where the plurality of cells are arranged in parallel, this system PLC controlling the system gates for directing the pathways of the cans to the VME-chosen cell for each can. This system PLC also controls the outgoing-conveyer system, where the filled cans exiting from their respective cells are merged and conveyed, and controls the conveyance of these filled cans from the cell site to the palletizing area, where the filled cans are sorted by customer for loading onto pallets, and the like. The fourth, or lowest, level of the computer system is the Programmable Logic Circuitry (PLC) associated with each of the cells, each of which communications with the central VME for instructions. The operation of the conveyer system at each cell, which cell includes a paint-batching machine 10, a paint can-lidder, a plurality of paint mixing machines, is controlled by the local cell-PLC, which cell-PLC also, through the photodetectors above-described, controls the operation of can-rotating stations where the can is rotated and its barcode read by the respective optical scanner, as well as the scanner itself, and also controls the operations of the piston-cylinders 79 for the raising and lowering of the weighing platform, as set forth above. There is one additional level, which is the microprocessor-control of each "ACCUTINTER", which is conventional and presently-used on "ACCUTINTER" machines. This control, one at each station 16, 18, controls the motor and pump operations, and solenoid-valve openings. However, according to the present invention, these local "ACCUTINTER" controls are subject to master control from the VME, as described below in great detail.

Figure 19A:
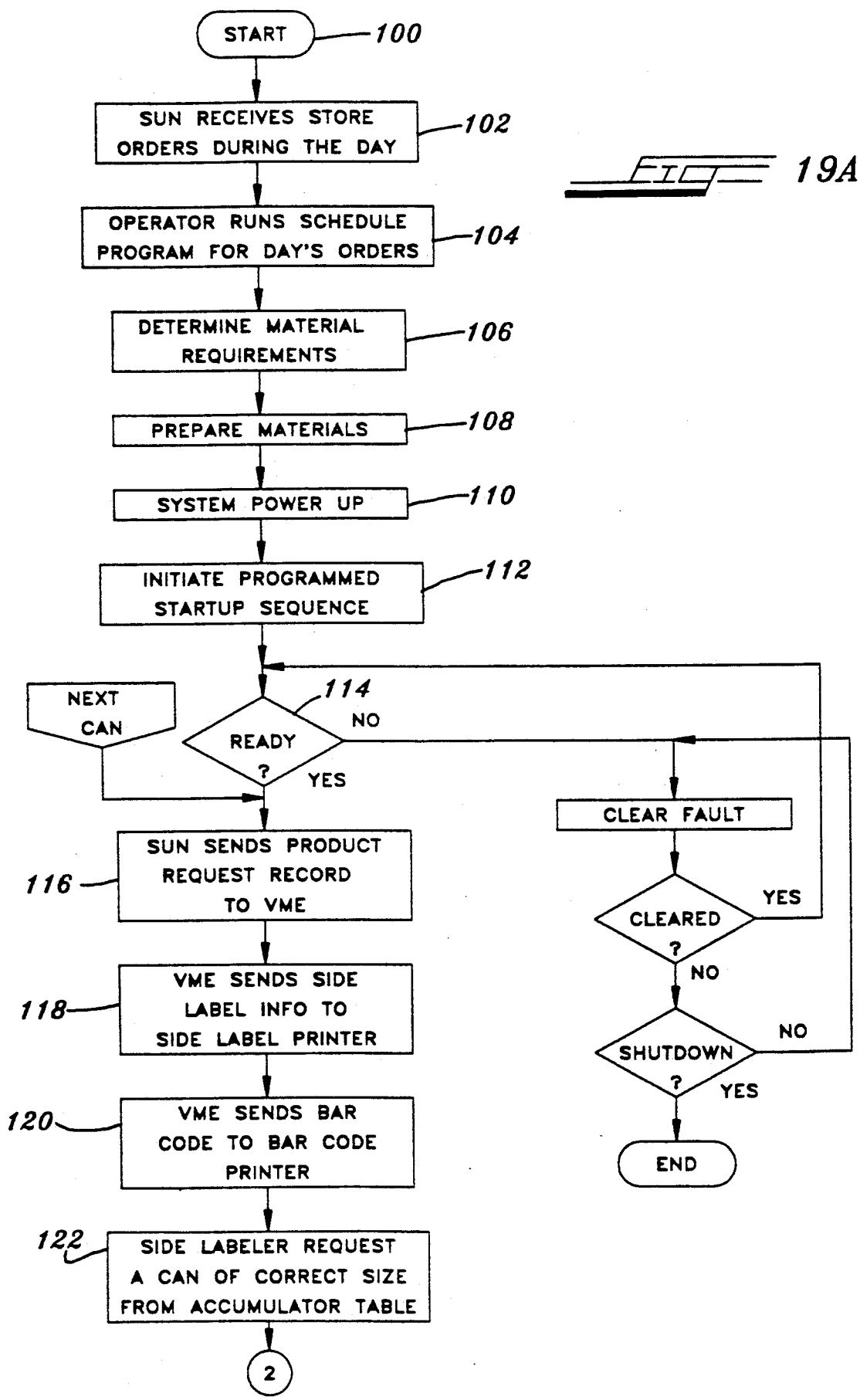
FIGS. 19A through 19E and FIGS. 20 and 21 are flow charts showing the sequence of operation of a single can during its processing by the system of the invention from an empty can to a full and mixed one with its storage in a palletizing area.
Figure 19B:
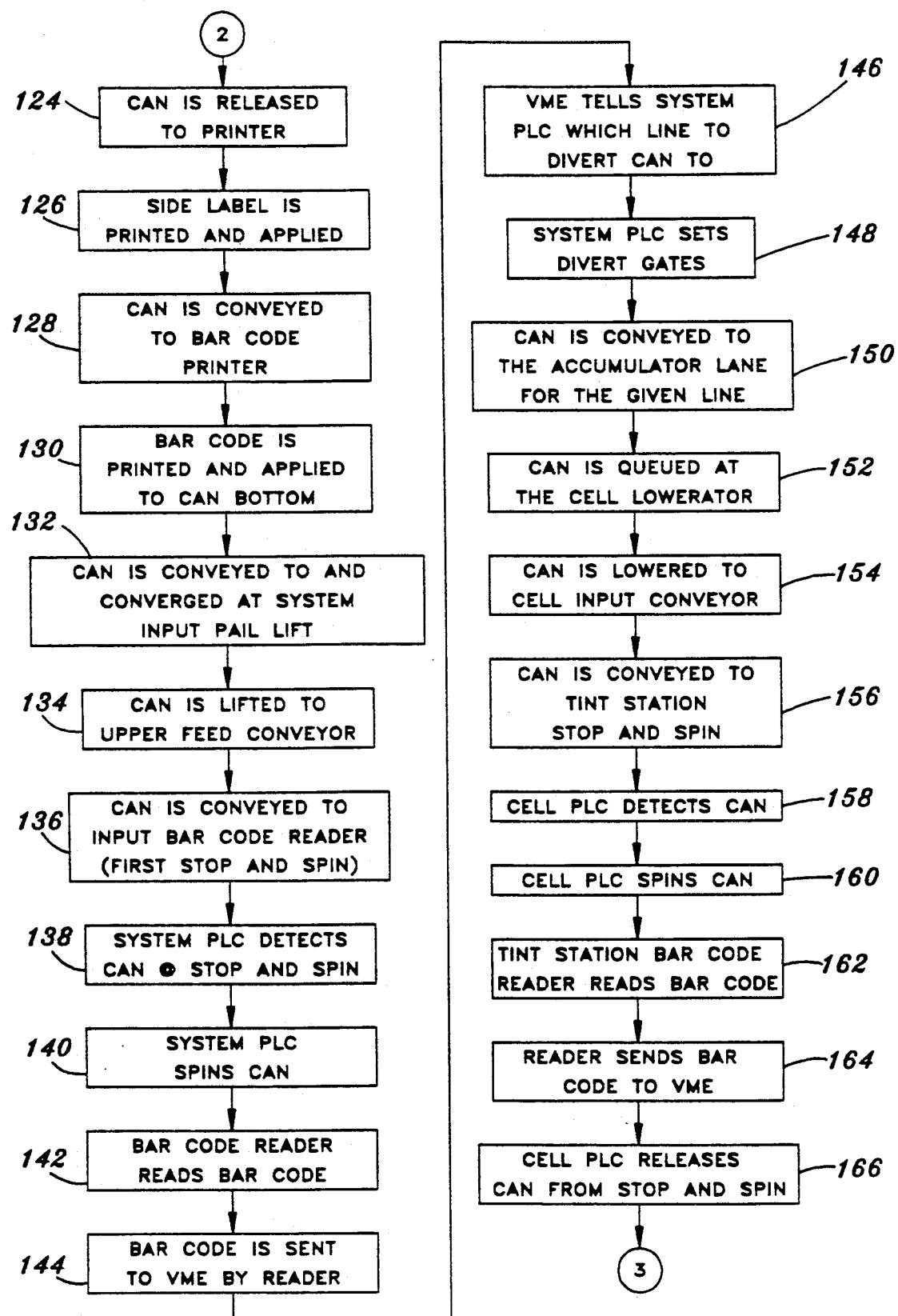
Figure 19C:
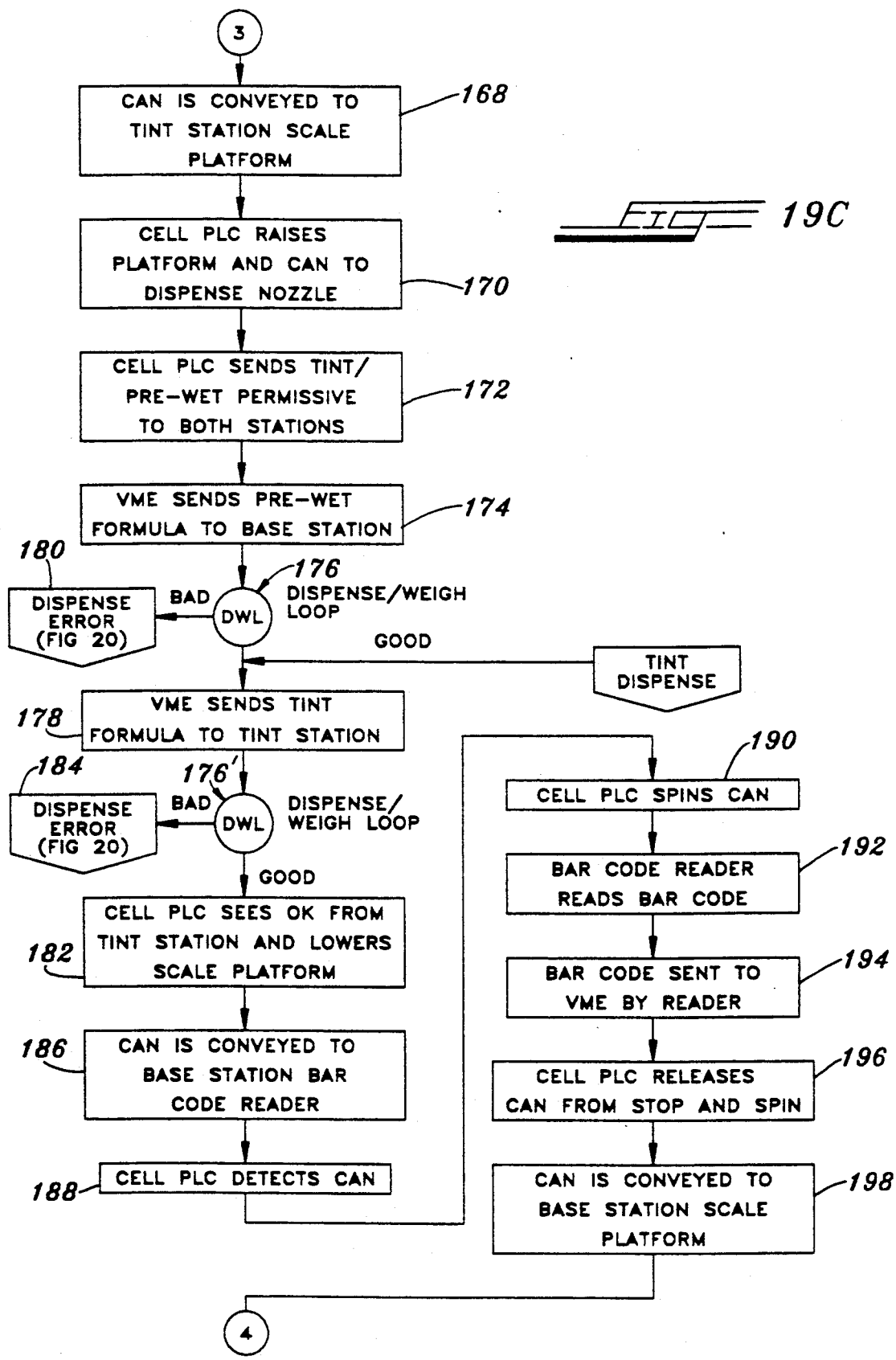
Figure 19D:
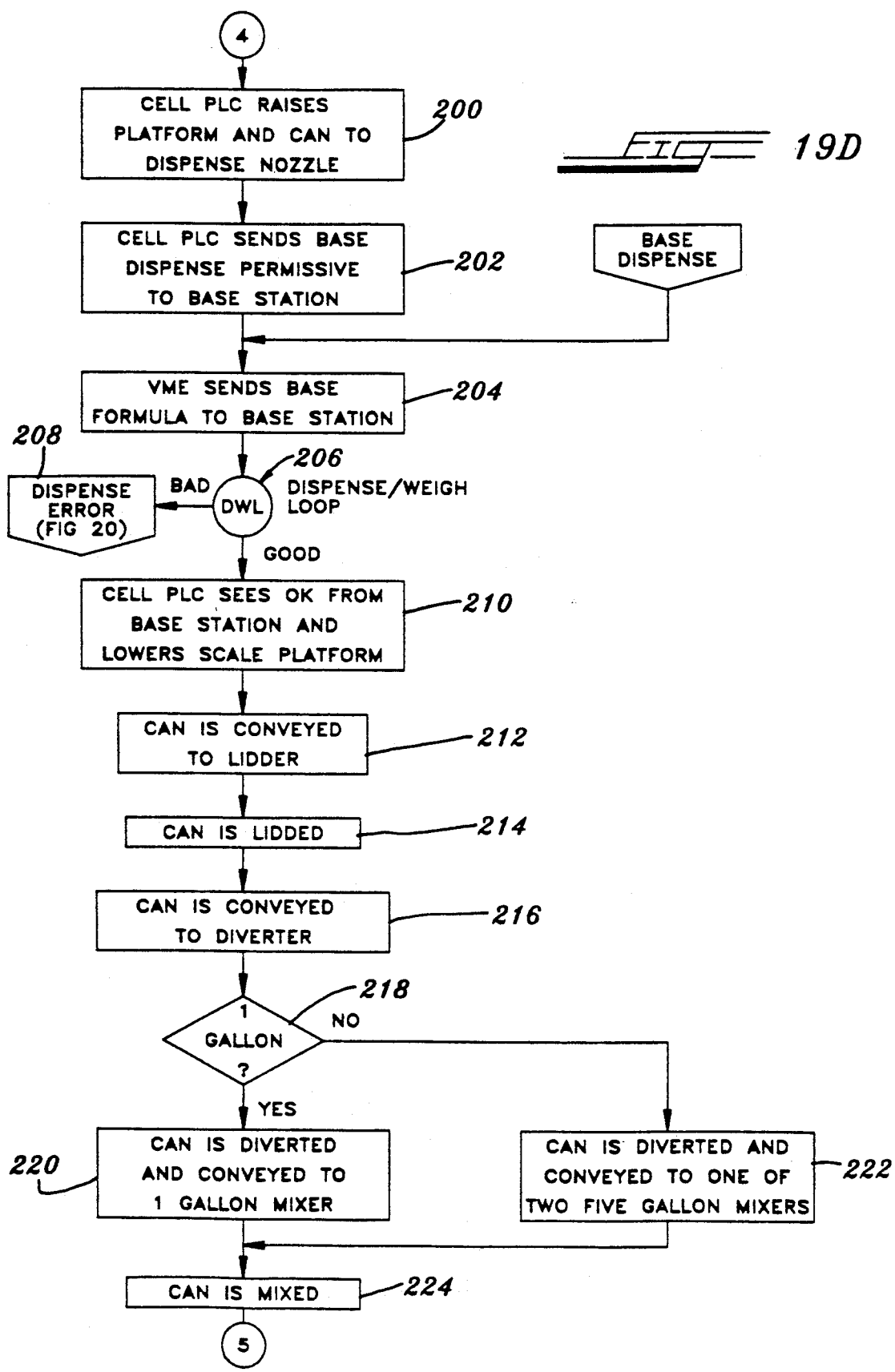
Figure 19E:
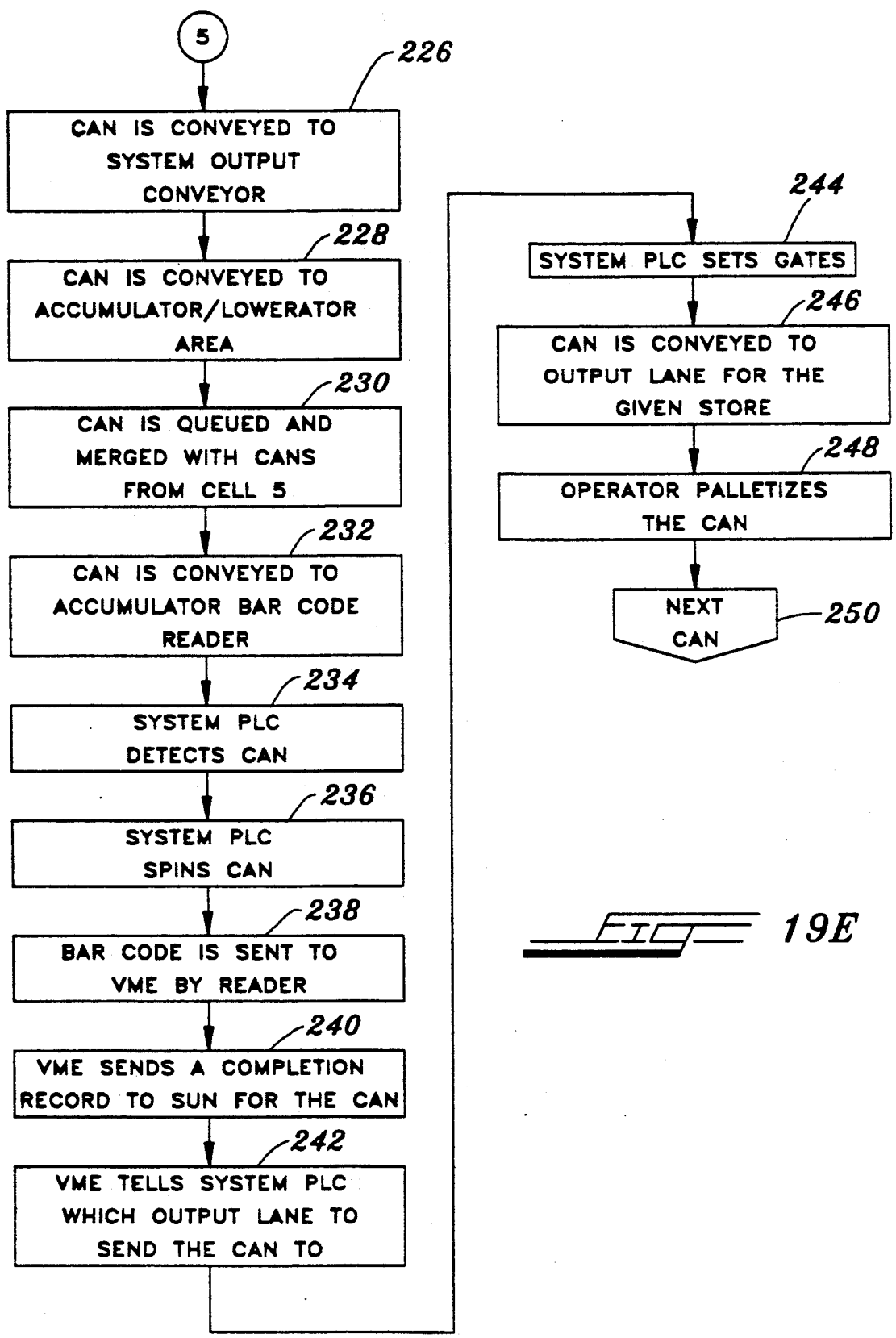
Figure 20:
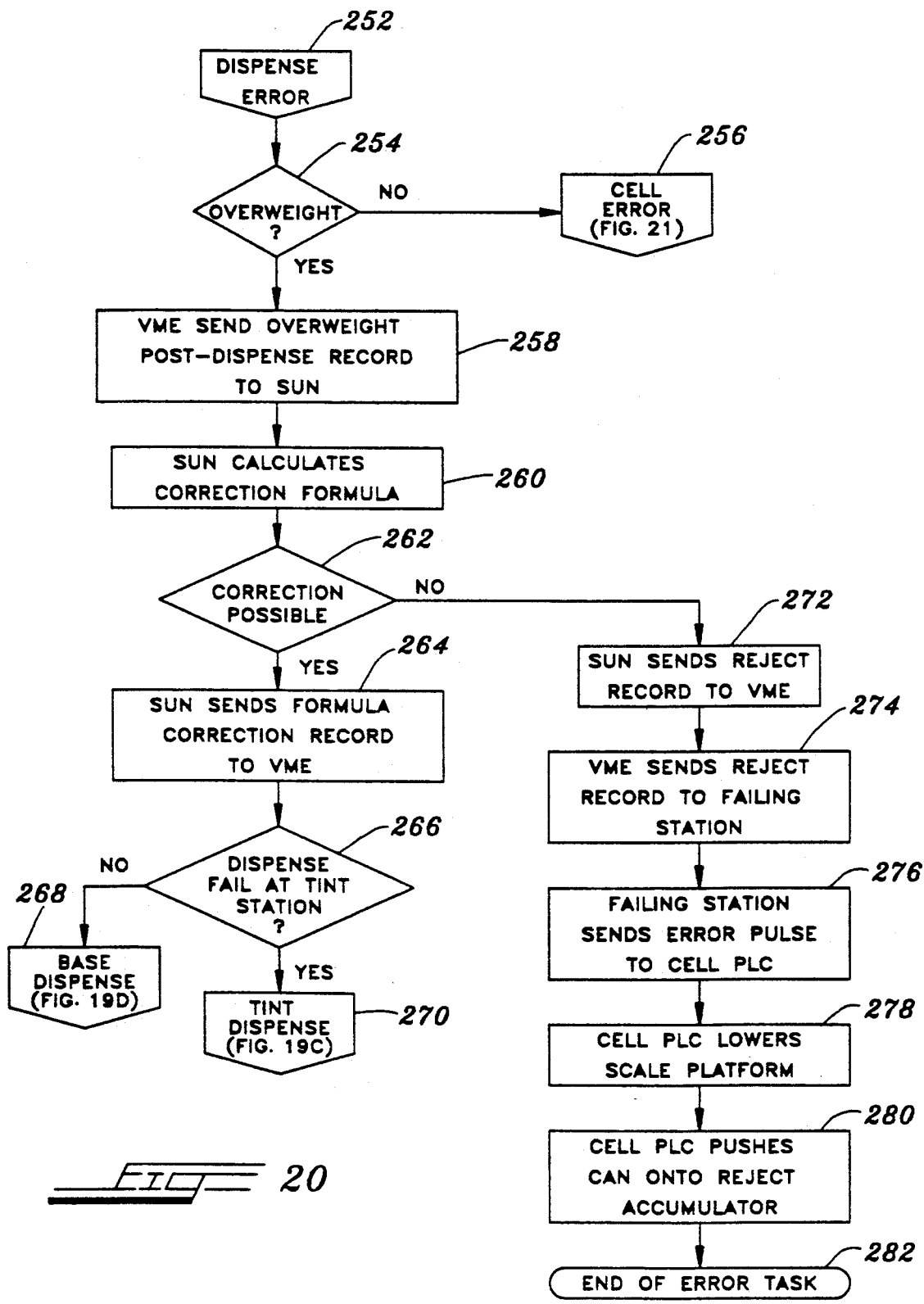

FIGS. 19A-21 show flow charts of the operation performed at each cell on paint cans conveyed therethrough, as well as the initiation of the entire process by the placement of an order into the SUN System. Those blocks marked with an asterisk indicate conventional steps performed by the "ACCUTINTER" manufactured by Miller Paint Equipment, Ltd. Referring to FIG. 19A for now, the SUN System is initiated (block 100), whereupon the SUN System receives orders from various outlets or stores where orders are placed (block 102), after which, the operator runs a scheduled program for the day's orders, which are to be filled (block 104). Blocks 106 and 108 indicate the determination of material requirements for that day's orders, while blocks 110 and 112 indicate the initiation procedures. If all is "go" (block 114), the SUN System will send the product-run schedule to the VME at the plant cite (block 116), one can at a time, which includes all orders of paint cans for that day. If there is a "No-Go", a fault loop, shown in FIG. 19A, will determine if the fault has been cleared. The VME, after receiving the schedule from the SUN System, sends information to a side-label printer (block 118), which side-label printer is conventional in the art and provides a physical label having the information written thereon as to the contents of the can, such as color, which label is attached to the can as it is conveyed out of accumulator-storage, as described below with regards to FIG. 30A. Block 120 indicates the information is also sent to the bar-code printer for developing a bar-code label to be attached to the bottom of the can on the bottom lid thereof, which bar-code label includes the general information as to the customer, relevant specifics, and so forth, such as line number, shipping point, formula, all of which is achieved by having the bar-code refer to a specific memory-address in the VME system, which memory-address is specific to that particular order, and includes therein, among other information, the formula for formulating the color desired for that paint can, which formula, of course, will control the operations of each station 16, 18 of each cell "ACCUTINTER", and the dispensing of the colorants and base to form the desired color. The bar-code printer is conventional, as well as the means for attaching the bar-code to the bottom lid of the paint can. Block 122 indicates that after the previous steps, the side-labeler will request a can of the correct size, whether it be a one-gallon or five-gallon paint can, from the accumulator table, which is the storage area for empty cans. Referring to FIG. 19B, blocks 124-130 indicate the above-described operations of actually placing the printed label and bar-code label onto the paint can proper. Block 132 indicates that after the placement of the bar-code label on the bottom of the paint can, the can is conveyed and converged to the system input pail lift, where the paint can is elevated above floor level to an upper conveyer system for transport via an upper feed-conveyer (block 134) to the site of the plurality of parallel-arranged cells. The upper feed-conveyer will first convey the can to a first bar-code reader, where the previously-emplaced bar-code label is read, this first bar-code station having a stop-and-spin mechanism for rotating the can, in order for it to allow the bar-code optical scanner to read the bar-code, thereby providing the necessary information to the VME to process the can during its conveyance to the cell-site. Blocks 138-144 show the above-described steps, in which the system PLC, coupled to the VME, detects a can at the first optical bar-code reader (via photodetectors, as above-described), and causes the can to be spun and the bar-code to be read, which information is sent to the VME. Block 146 indicates that the VME system will tell system PLC which line the can is to be diverted to, to indicate which cell of the multiple plurality of cells is to be used for that particular can. The system PLC will set the appropriate and conventional diversion-gates (block 148) to allow for the conveyance of the particular can to the desired chosen cell, whereupon the can is conveyed to an accumulator lane, where the cans are placed in a queue (block 150) for subsequent transport to the input conveyer 20 of respective cell. Block 152 indicates that the can is queued at a cell lowerator that lowers the can from the upper conveyer system to the substantially floor-level conveyer system where the cell is located (block 152), and, whereupon, the can is delivered to the input station of the conveyer 20 of the cell (block 154) and conveyed to the first stop-and-spin station of that particular cell (block 156), which actually constitutes the second stop-and-spin and optical reading of the can during its transport. This stop-and-spin station, where the bar-code is read (block 156), is done just prior to its entry into the tint-dispensing station 16 of the respective paint-batching machine 10. The cell PLC then detects the can, as the system PLC did before at the first optical reading, (block 158) and causes the can to spin and the bar-code area read, which information is sent to the central VME, and, thereafter, the can is released (blocks 160-166). Thereafter, the can is conveyed to the tint-station 16, where the platform 76 is raised, causing the side plates 72 and 74 to contact the bottom of the paint can, as described above, thereby lifting the can in juxtaposition below the dispensing nozzles of the tint-station 16 (blocks 168, 170). Upon the initiation of the raising and completion thereof of the paint can via the weighing platform, with the can tared, the cell PLC will send a tint-prewet permissive request to both dispensing stations 16 and 18, for the readying thereof (block 172), while, thereafter, the central VME sends the prewet formula to the base-station (block 174) for the amount of liquid base to be dispensed from the second station 18 through the first station 16, as above described, in order to wet the bottom of the can (block 174). After completion of this step, the prewet liquid base is dispensed (block 176), after which, the quality weight-loop control is activated to weigh the contents dispensed to make sure that the liquid base is in the proper amount. If such has been determined to be "good," then the normal procedure follows (block 178), where the VME sends the formula to the tint-station 16 for additional liquid colorants to be dispensed, whereas if the weight-loop has determined a "poor" dispensing, then a dispense error will be indicated (block 180) and the "Dispense Error" subroutine indicated in FIG. 20 undertaken, described below in greater detail. Thereafter, each of the additional liquid colorants making up the particular formula of the color of the paint to be formed is dispensed, and after each dispensing of each colorant the quality-control weight-loop being undertaken to determine the proper dispensing in weight of each colorant. Assuming that all of the colorants have been dispensed in their proper amounts, the platform at the first tint-station 16 is lowered (blocks 182, 186) for subsequent transporting of the can to the second base-station 18. If, however, any one of the dispensings of the liquid colorants has been determined to be in error, then an error signal is indicated (block 184), and the subroutine shown in FIG. 20 carried out. Blocks 186 through 198 show substantially the same process for the second base-station 18 as that done at the tint-station 16, where the can from the tint-station 16 is conveyed to the base-station's bar-code reader, where the can is detected, spun and then read by the optical bar-code reader (36 in FIG. 1), which reading is sent to the VME, which causes the cell PLC to release the can from spinning, and, thereafter, the can is conveyed to the dispense-area directly underneath the dispensing nozzles of the base-station 18. At the base-station, the same procedure as carried out at station 16 is carried out here, with the weighing platform lifted to raise a can to juxtaposition below the dispensing nozzle, whereupon the cell PLC sends a base-dispense permissive signal to the base-station microprocessor for dispensing of the remainder of the liquid base or bases (blocks 204, 206), as determined by the VME. If the quality-control weight-detection indicates an error, then the subroutine in FIG. 20 is carried out (block 208), as before, and if the dispensing is "good," then the cell PLC sees an "OK" signal from the base-station's microprocessor indicative of the completion of the base-dispensing, and, thereafter, deactivates the piston-cylinder 79 at the base-station in order to lower the weighing platform, to place the thus-completely filled paint can back onto the conveyer 46 (block 210). Thereafter, the can is conveyed to a conventional lidder (block 212), where the can is lidded (block 214), and, thereafter, the can is conveyed to a diverter gate (block 216), where the can takes either one of two paths, depending on whether its a one-gallon can or a five-gallon can (block 218). If it is a one-gallon can, then the can is diverted and conveyed to a one-gallon conventional or automated paint mixer (block 220), whereas, if it is a five-gallon can, then the can is diverted and conveyed to one of two five-gallon can conventional or automated paint mixers (block 222). At the paint mixers, the contents of the paint can are mixed thoroughly (block 224), after which, the can is conveyed to the system output-conveyer (block 226), by which the can is conveyed to the accumulator/lowerator area (block 228), where the can is queued and merged with other cans from other cells (block 230), and, thereafter, conveyed to the fourth and final bar-code reading therof at the palletizer-accumulator bar-code reader station (block 232), where the system PLC detects the can (block 234), whereupon the can is spun as before (block 236) and the bar-code thereof read by the reader (block 238) and sent to the system VME, which system VME then sends a completion-record (block 240) to the central SUN order and inventory control System (block 240). The VME will also instruct the system PLC which output lane the finished can is to be diverted to (block 242), which causes the system PLC to set the appropriate diverter gates (block 244) by which the can is conveyed to a particular output-lane (block 246) representing the particular store that ordered that particular paint can, or the like. Thereafter, an operator will palletize the cans by placing it on pallet (block 248), thereby completing one can-cycle, with whole procedure being repeated for the next can (block 250).

The necessary element in the operation of the system is to create a set of formulae for a given set of bases and a given set of colorants. The formulae are stored in computer memory. In order to operate a color line, day-to-day, each batch of colorant and each batch of base is, or should be, standardized against a given standard. Any new base is required to be adjusted up or down for a set-up tolerance for each color based on variations from a given standard. Colorants react the same way with the same base. However, it is a physical impossibility to have the same colorant with the same exact tint at different points in time, due to the make-up of colorants. Often, from batch to batch, the ability of a base to take on a color varies, resulting in variations from batch to batch of a mixture of colorant and base for a given formula. In setting up the formula, an arbitary standard is selected. This is usually the first batch of colorants and the first batch of base. Because the batches vary, it is desirable to always bring a new batch back to the arbitrary standard. Accordingly, after each base and colorant is passed through a spectrophotometer, a series of curves can be generated that would show for a particular color or base the variation in depth of each particular color combination by the amount of the particular base or colorant being added. Accordingly, when a formula is made up with different bases and different colorants, they can all be adjusted to a standard, depending upon the amount of each colorant used, since the depth of the color will vary with the amount of colorant used. So, therefore, when a new batch of colorant is being used, it is measured by the spectrophotometer and a correction factor is provided for this particular colorant to adjust back to the standard. A correction factor has now been applied to the colorant in the formulation of the particular combination of colorants in base to be utilized in a particular run. This recalculated formula is based upon the standards that existed in the original standard batch. This type of reformulation has resulted in a better than 0.2 $\Delta$ E variation in color. $\Delta$ E is a well-known standard in spectrophotometry for measuring color drift. A $\Delta$ E of 0.5 is the best that a skilled color matcher can distinguish between different colors.

When there is a calibration for a particular day's run for a new batch of colorants and bases, the formulas are recalibrated back to the standard by the computer, and the computer knows what colorant is being used in order to make various changes to compensate for changes from batch to batch variations. Accordingly, applying the above to the current process, in the event there is a underdispensed amount of black, this will be detected by the dispensed error routine, described below in the discussion of FIG. 20. If the amount of dispensed material for a particular colorant is found to be short, a second dispense is provided to make up the difference in the amount of black for that particular dispensing cycle. The problem occurs when there is an overdispensing of black. If the dispensed colorant is found to be overdispensed, and the overdispensed amount exceeds certain limits, i.e. too much to be corrected, the dispense error will occur as described below, and the container will be rejected. If this occurs mor than twice, the system will be caused to shut down. If the overdispensed amount falls within the limits which can be corrected, i.e. suppose 10 grams are to be dispensed and 10½ grams are dispensed, the computer senses the amount of extra colorant that has been dispensed, sends a signal to the computer to cause the formula being utilized for this particular dispense to be recalculated and a new formula created for the additional colorants and base to be added. This new adjusted formula should allow the new mixture of colorant and base to produce the same color within the $0.2 \Delta E$ variation, as described above.

This type of procedure for detecting error and the resulting reformulation of the formula being used, also takes into account variations which occur in the base, the colorant, and in particular batch run variations that will occur in the volume being dispensed as a result of temperature and viscosity variations.

Figure 21:
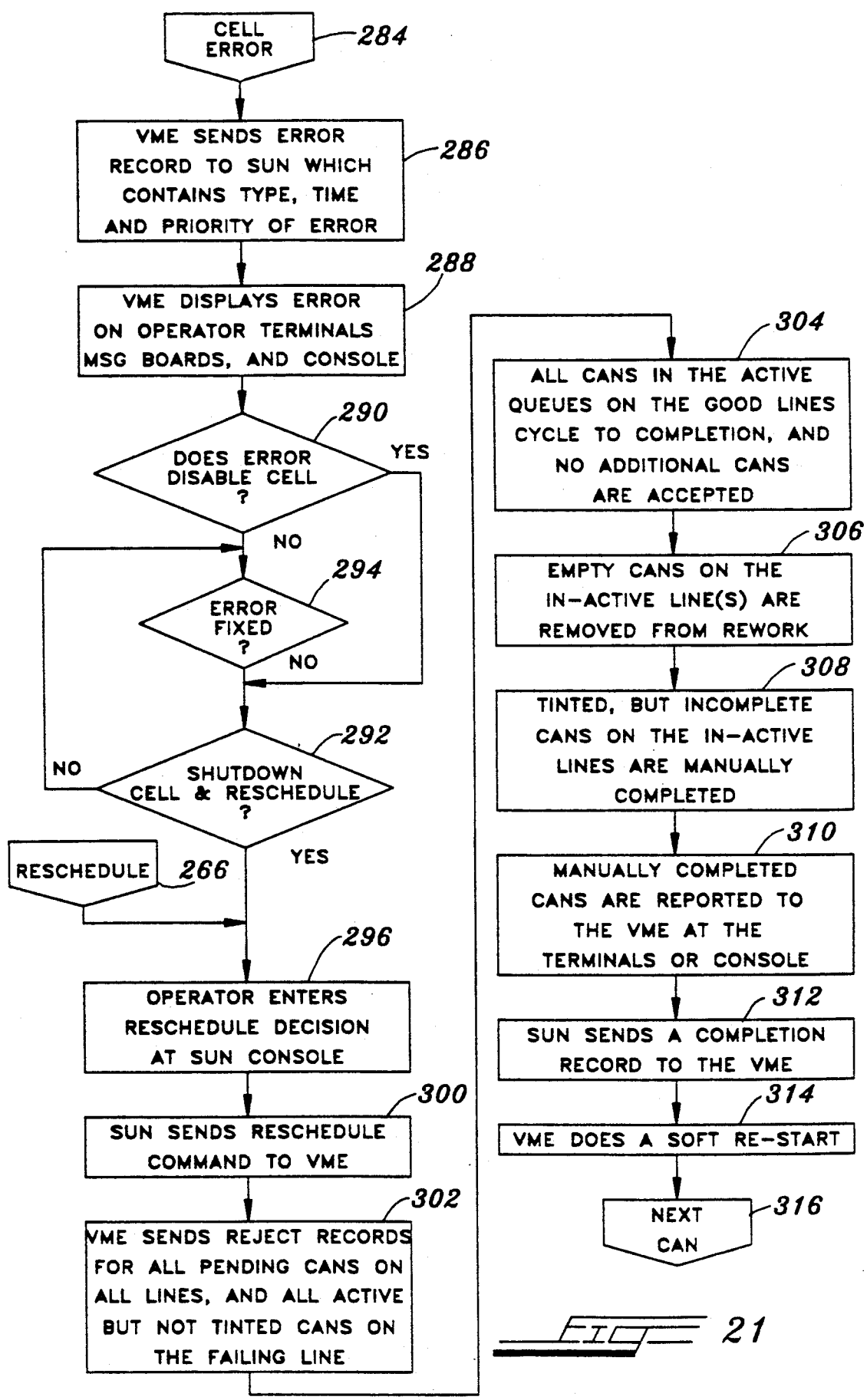

FIG. 20 shows the "Dispense Error" routine, starting with block 252, which routine is carried out when any dispensing of a colorant or liquid base has been determined to be of a quality-control weight outside of the tolerance-limits as described above with references to blocks 180, 184, and 208. If the quality-control weighing indicates "overweight" (block 254), then the VME system will send such information to the central SUN System (block 258), which will then attempt to calculate a correction formula for that paint can (block 260), and determine whether such is possible or not (block 262). If a correction formula is possible, meaning that the other colorants or bases to be dispensed may be dispensed in different amounts as originally set up, then the SUN System will instruct VME of such corrected formula (block 264), whereby VME will instruct the appropriate tint-station or base-station to dispense the remaining ingredients in the new, corrected amounts (blocks 266–270). If correction is not possible, then the SUN System sends a reject command to VME (block 272), which, in turn, sends a "reject command" to the failing cell-station (block 274), which failing station's microprocessor-control sends an "error pulse" to the cell PLC (block 276) to thereby cause a lowering of the weighing platform (block 278), whether it be at the tint-station 16 or base-station 18, after which, the cell PLC causes the can to be pushed onto the reject-conveyer via push plate 30 or 30' (block 280), at which time, the end of the error-task is achieved (block 282), and the next can processed. As mentioned above, if the "dispense error" was caused from an underweight, or underdispensed, liquid colorant rather than an overdispensed one, as shown in (block 256), then this may generally indicate a "cell error," such as a motor breakdown, pump malfunction, or the like. The routine to accommodate this is shown in FIG. 21, beginning with the indication of a "cell error" (block 284). Upon receiving such a "cell error" input flag for the underdispensing of a liquid colorant or a base, the VME will send an error record to the central SUN System, which record will contain the type time and priority of the error indicated, (block 286), and, simultaneously therewith, will display it on the operator's console (block 288), after which, the VME will determine whether or not the cell error disables the cell or not (block 290). If the error is of the type that the cell is disabled and must be repaired over a substantial period of time, then a decision as to whether the cell should be shut down and rescheduling of the cans on that particular cell is be carried out (block 292) must be considered, and if the error is determined that at least there is the chance it need not be disabled, then it must be determined whether the error has been fixed or not before the cell is restarted (block 294). If the cell must be shut down, then, of course, all the cans thereon as well as those backed up on the queue line for that cell must be rescheduled and redirected to different cells, whereupon an entire new schedule process is undertaken by the SUN System indicated in blocks 296–314, thereby accommodating the broken-down cell, after which the next can is processed with the particular cell not being used until it is repaired.

Figure 22A:
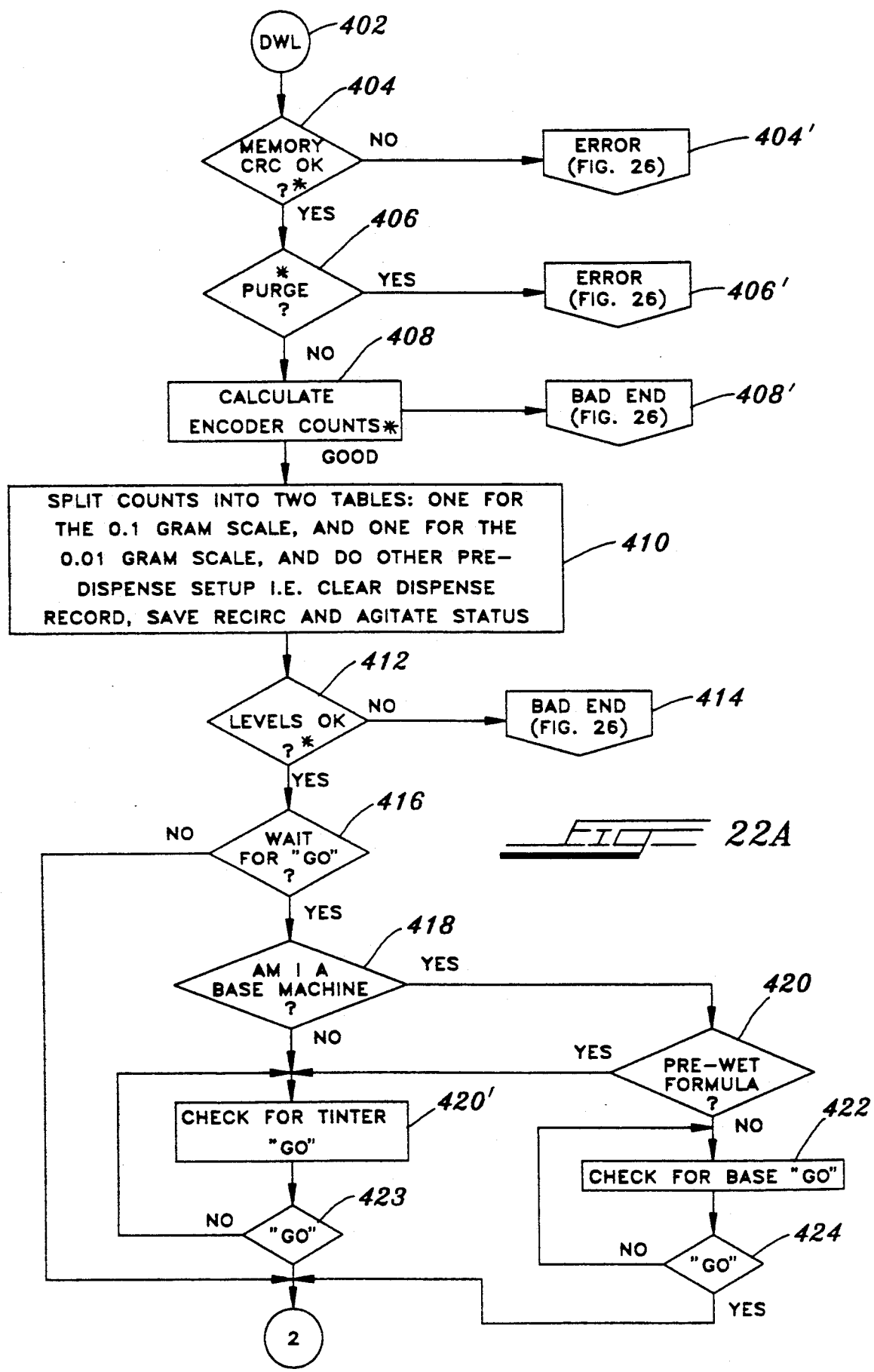
FIGS. 22A through 22D and FIGS. 23 through 27 are flow charts showing the quality check weighing loop performed after each dispensing of colorant or base at each of station.
Figure 23:
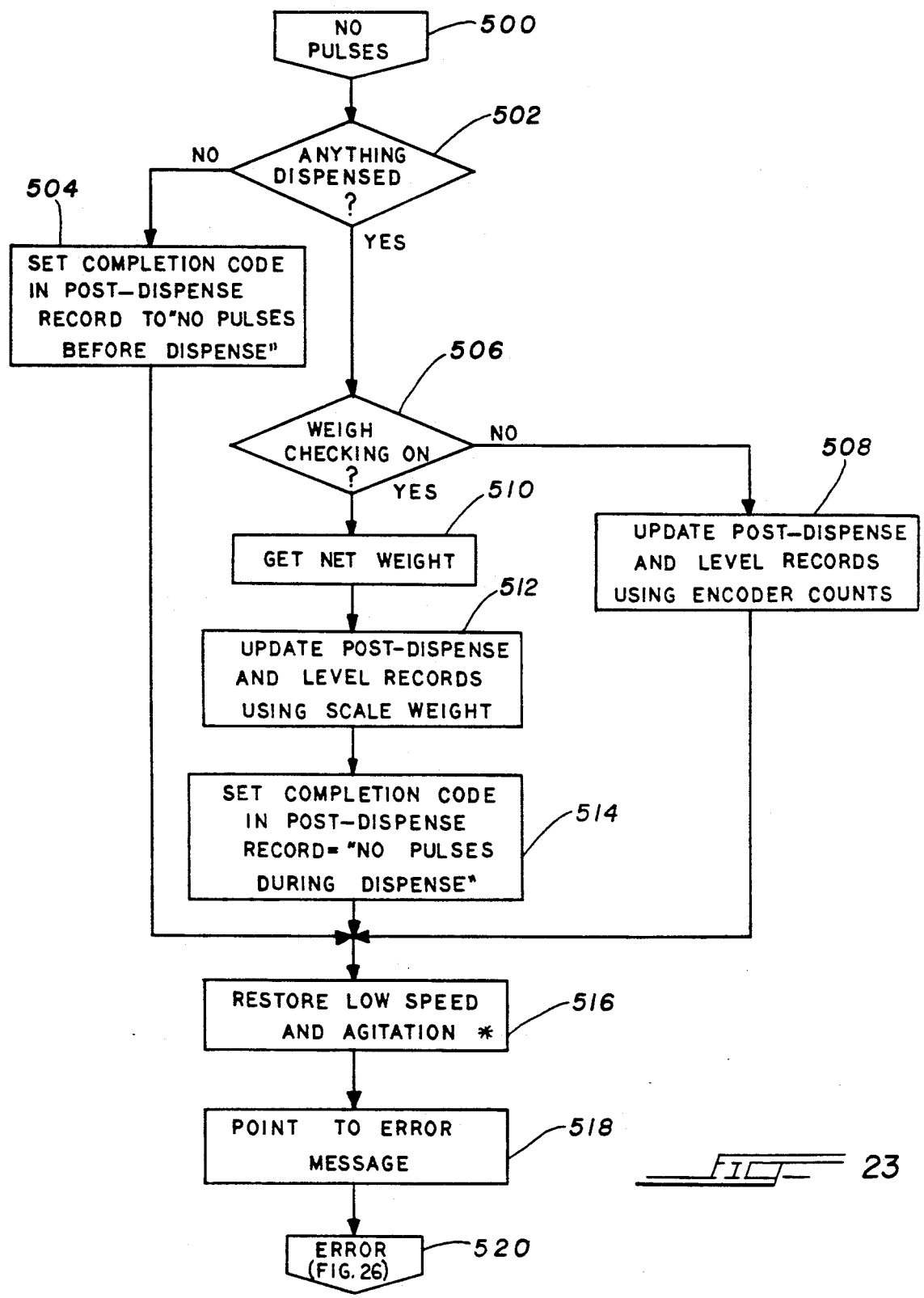
Figure 24:
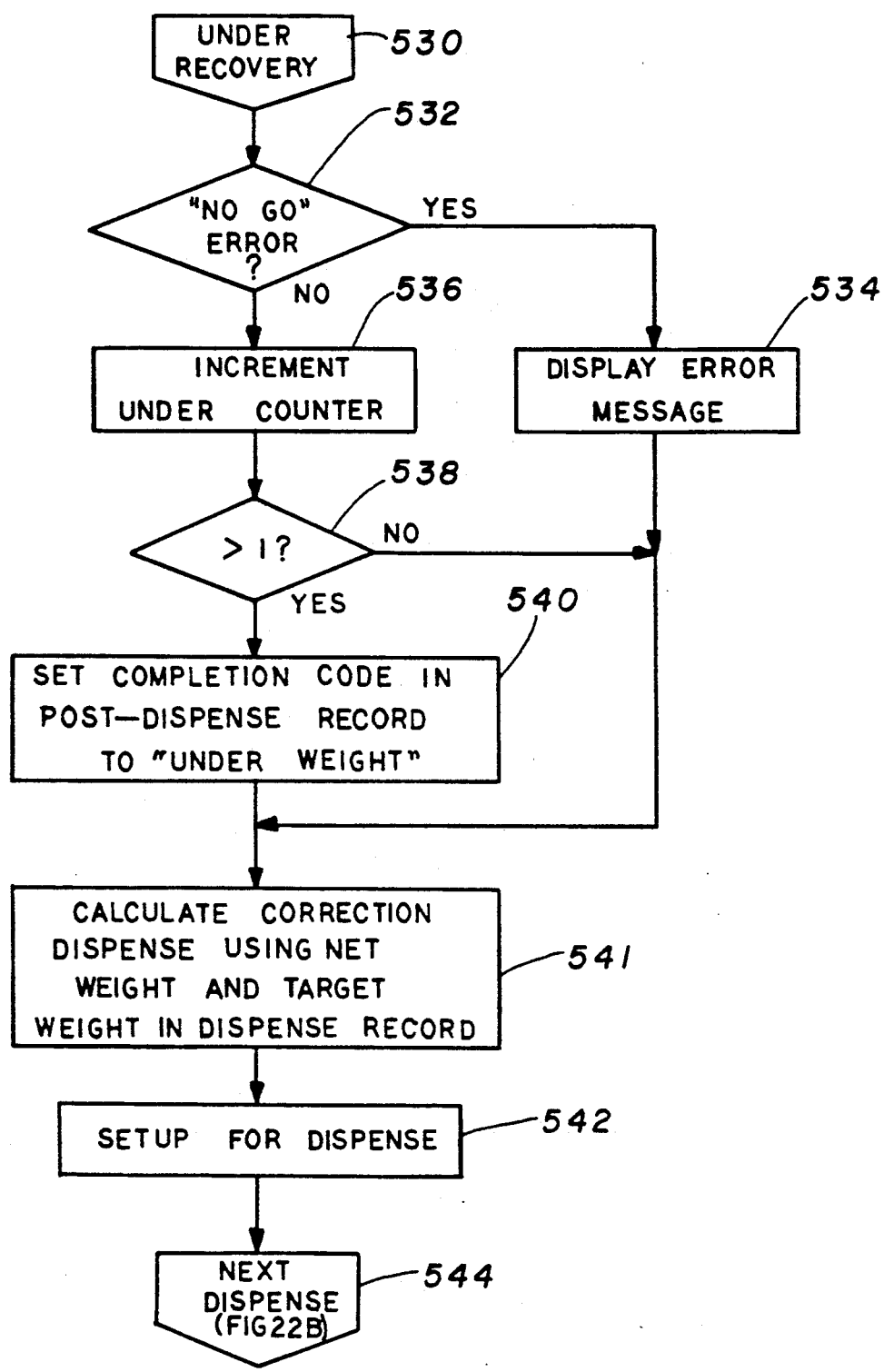
Figure 25:
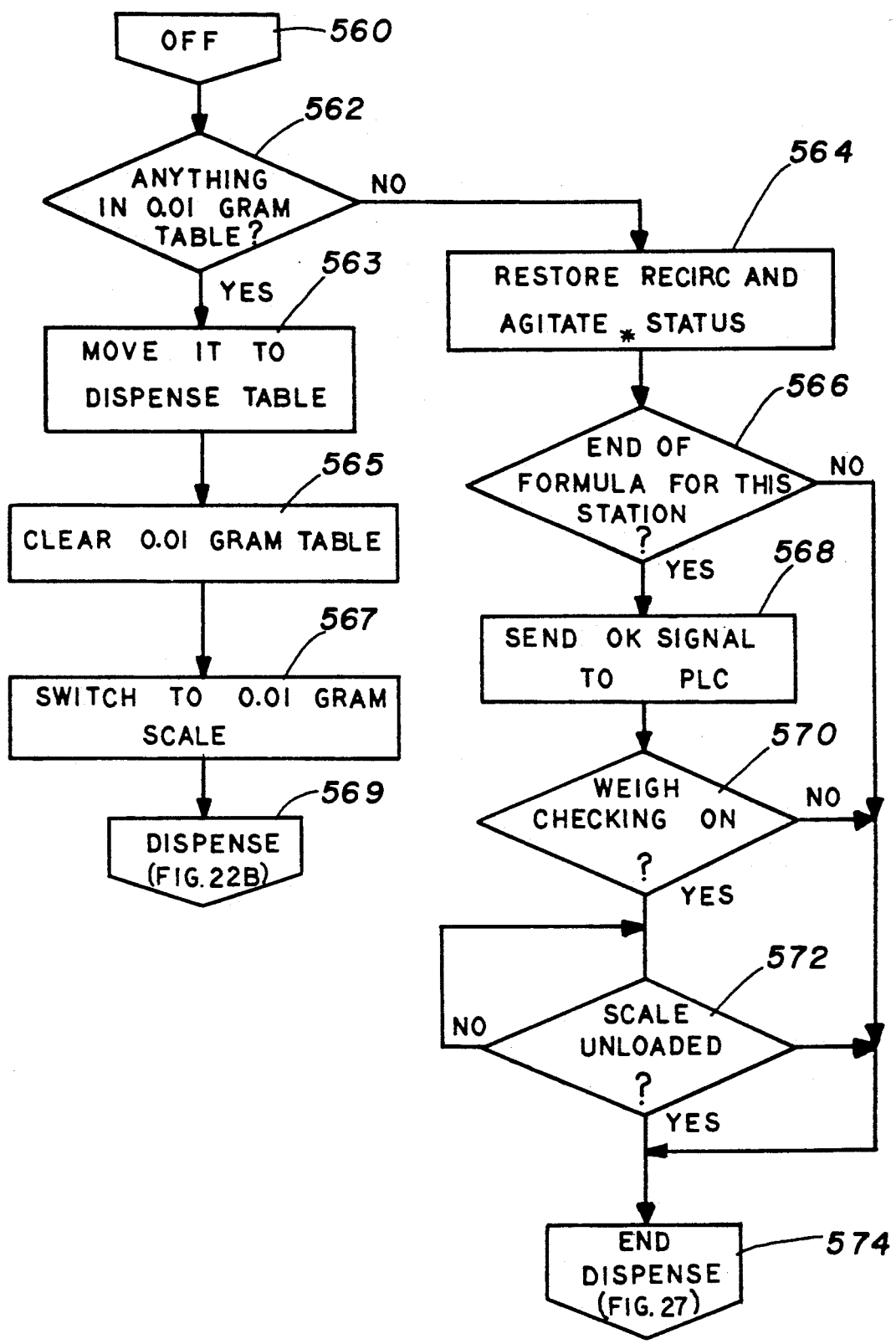

Referring now to FIGS. 22A through 27, there is shown therein the flow charts for the actual dispensing of each of the liquid colorants and liquid base as well as the checking of each dispensing via the quality-control weighing thereof to determine the proper dispensing to produce a quality product. These flow charts are representative of the dispensing of each of the stations 16 and 18, and each dispensing at the tint-station 16, these flow charts being generally included by the blocks 176, 176' in FIG. 19C and block 206 in FIG. 19D, each dispense weight-loop indicated by these blocks being controlled by the flow charts in the FIGS. 22A through 27. Referring to FIG. 22A, the dispense-weight loop is indicated generally by block 402, which is representative of any of the blocks 176, 176' in FIGS. 19C, and block 206 in FIG. 19D. Block 404 indicates a memory check, called cyclic redundancy check, which checks for the calibration constants, operating flags and supply canister levels of the particular tint-station 16 or base-station 18. If such check fails, then an error signal (block 404') is generated, which is discussed in greater detail when discussing FIG. 26. If the memory check clears, then a "purge" check (block 406) occurs, to see if each orifice of the respective station 16 and 18 requires clearing, or dispensing, in order to remove any of remaining colorants from the previous dispensing process. If there is an error, for example, if the purge did not occur, then another error signal (block 406') will occur and the error process shown in FIG. 26 carried out. Block 408 indicates the calculation for the encoder count, the encoder count counting the rotations of a shaft coupled to the drive motor. A "bad end" results (block 408') if the formula from the SUN System is not capable of being performed by the particular machine because of the requirements for encoding that are not capable of achievement in that given machine. The formula from the SUN System, if capable of being carried out on the machine, is split into two tables (block 410) one for the 0.1 gram resolution scale, and one for the 0.01 gram resolution scale, which is relevant at the tint-station 16, where there are two scale-heads employed, one having a resolution of 0.01 grams and one of 0.1 gram resolution. Block 412 indicates a check of the levels in the supply canisters in order to ensure that there is enough supply therein to dispense the required amount of liquid colorants or base for that specific formula. If not, then another bad end (block 414) ensures. In block 416, there is a decision block where it is determined whether the system should wait for a "go" signal or not, a "go" signal being indicative of an automated run. If not, then a simple dispensing of the liquid colorants is employed. If it is an automated run, then it is determined whether the particular station is a base-station (block 418) or a tint-station. If it is a base-station, (block 420) then it is determined if the dispensing from that base-station is a "prewet" dispensing to be sent to the first tint-station for coating the bottom of the can, as above described, and in which case, the base-station will wait for a "go" before the dispensing thereof. If it is not a "prewet" dispensing, then block 422 indicates that the base-station simply waits for a "go" signal, which is indicative of the fact that the scale at the base-station has been lifted and has raised the can awaiting dispensing, as indicated by blocks 422 and 424. If it is a tint-station as shown in block 420, then a "go" signal is awaited for indicating that the weighing platform has been elevated and the paint can lifted and awaiting dispensing, as shown in blocks 420', 423. Referring to FIG. 22B now, after all of the above has been determined, it is now determined whether there is a weight-quality checking or not. If it is on, as would generally be the case (block 426), then block 428 determines that a decision is made as to whether the dispensing is at the base-machine or at the tint-machine. If it is at a base-machine, then it must be determined whether the dispensing is a "prewet" formula liquid base that is to be dispensed at the tint-station (block 430), in which case decisions must be made as to the correct scale-head connection at the tint-station. If it is not a "prewet" formula, then it must be the dispensing of the base at the second base-station, thereby causing the connection (block 432) of the 1 gram scale-head at the base-dispensing station. If it is not a base-station but a tint-station, then connection is made to the 0.1 gram scale-head (block 434) so as to couple the 0.1 gram scale-head to the "ACCUTINTER", after which, the net weight of the can and its contents thereof are measured (block 436) where the levels thereof are compared to that stored in the formula in the relocatable memory to make sure none of the previously-dispensed liquids have spilled out, or the like. If all checks out (block 438), then the build-dispense masks commands are generated (block 440), which means that it is determined which of the pumps are to be used for the dispensing, which of the high speed valves, and so forth, for achieving the proper dispensing of the particular liquid colorant or base. If the weight, however, did not check out, then an "error" signal (block 442) is generated and the routine shown in FIG. 26 carried out. Thereafter, the pulses and motor speed are checked out to ensure that the motors are operating correctly (block 444), and if it is OK (block 446), then the logic determination is made as to the existence of any more colorants to be dispensed (block 448). If the pulses or motor speed are not correct, then "no pulse" signal (block 450) is generated, and the routine shown in FIG. 23 carried out, as described below. If there are no more colorants to be dispensed, for example, at the stage at the end of the formula of the paint formulation, (block 452) then the "off" routine shown in FIG. 25 is carried out, as described below. If there are more colorants to be dispensed or liquid base, then another "wait for go" is done, as shown in block 453 in FIG. 22C. The next logic determinations are made as shown in block 454, and decisions made as to whether the particular dispensing is at the base-station or the tinter. If it is at a base-station, then, again, it is determined whether it is a "prewet" formula or not (block 455), and if it is, then the "go" signal is awaited for (block 456) to make sure that the scale is lifted up, after which, a "go" signal is generated (block 458), and a liquid base dispensed (block 460). If it is the tint-station, whether it be a liquid colorant being dispensed or the "prewet" formula, then the tinter station awaits for the "go" signal (block 462) which is indicative of the fact that the weighing platform has been lifted and the can elevated awaiting dispensing, and the "go" signal generated (block 464), after which the dispensing of the particular liquid colorant or "prewet" formula liquid base dispensed (block 460). During the dispensing of a colorant or the liquid base, if there is generated a "no pulse" signal by the mechanism monitoring the motor operation, then a "no pulse" error signal is generated (block 461) and the routine shown in FIG. 23 carried out. A "no-go" signal may be generated during dispensing if the can were to tip over, for example, during the dispensing process, or if there were a failure of the cell-PLC, which would inhibit the "go" signal from the weighing platform. A "no-go" code would be sent to the post-dispense record indicating a problem, to which an operator is to attend and fix (block 463). Logic determination is again carried out to determine quality-control weight-checking is on (block 466), and if not, a "fake" weight is determined shown in block 490 of FIGS. 22D to be discussed below in greater detail. The "fake" weight is the weight obtained from the formula-table indicating what the reading ought to be, so that the supply levels, etc. may be properly updated after dispensing. If weight checking is on, then the net weight is obtained (block 468), which is a tare weight, after which, the gross weight (block 470) is calculated to indicate the total weight of the paint can and the contents therein. Thereafter, referring to FIG. 22D, the decision (block 472) as to quality is carried out in order to determine whether the net weight is within the tolerance range required, dependent upon the 0.01 gram scale-head being used or the 0.01 gram scale-head used, if it is a tint-station, or a 1.0 gram scale-head if at the base-station. If the net weight is within tolerance, logic determination is made as to whether weight checking is on or off (block 474), and if it is, then the post-dispense record using the particular scale weight is used for updating (block 476), after which (block 478), the supply level is then updated. Thereafter, under normal procedure, the new "next-dispense" cycle will take place, if there is another colorant to be added, (block 480), the cycle being repeated by going back to block 448 in FIG. 22B. If the net weight is not within tolerance but is under, (block 482) in FIG. 22D), then the "under-recovery" routine is carried out shown in FIG. 24 and discussed below in greater detail, which routine, in summary, simply causes a reinstitution of the very same dispensing cycle for that very same liquid colorant until the correct amount is dispensed. If the net weight is over, then the post-dispense level records are updated according thereto, and a code is generated (block 486) indicating such being overweight. After that, the "end dispense" routine is generated (block 488), and the logic steps shown in FIG. 27 carried out. Of course, as described above, if there is such an overweight detected, then the SUN System will try to determine whether such can be corrected and and updated formula created in order to overcome the over-dispensing of that particular liquid colorant or base, as described above in the description of FIG. 20. If quality-control weight-checking is not used, then a "fake" weight is generated (block 490), thereby using the nominal weight being set forth int or base, as described above in the description of FIG. 20. If quality-control weight-checking is not used, then a "fake" weight is generated (block 490), thereby using the nominal weight being set forth in the formula (block 492) for updating the dispense records, where upon the level records are updated using this "fake"

weight (block 494). Thereafter, the "next dispense" is generated (block 480), if there is such another one, and the flow returns back to block 448 in FIG. 22B. The "fake" weight is necessary in order to ensure that there is a proper monitoring of the supply levels of the colorants and base.

As described above, the motor operation is continually monitored to ensure proper operation, and if such does not occur, then a "no-pulse" error is generated, as set forth above when discussing blocks 450 and 461. The error routine for the no pulses is shown in FIG. 23, indicated generally at the beginning by reference block 500. When there are no pulses detected from the motor driving the station-pumps (block 450 and 461), the system-routine checks to see if anything is dispensed (block 502), and if not, then appropriate post-dispense records are indicated in the post-dispense information area (block 504), while, if there were something dispensed at the particular station for the particular colorant or liquid base, then the logical decision is determined whether weight-checking is on or off (block 506). If not, then the usual updating of the post-dispense and level-records is carried out (block 508), while if weight-checking were on, then the net weight of the can with its contents is determined (block 510). This net weight information is also used for updating the post-dispense and level-records using the scale-weight (block 512), after which, the completion codes appropriate to the operation are recorded in the post-dispense records with indication of a "no pulse" during the dispense (block 514), and, thereafter, as after other completion steps, the containers holding the supply of liquid colorant or base is restored to a low speed agitation (block 516) for ensuring that the colorants are properly mixed, which process is conventional in the "ACCUTINTER" machine. After this, the error message is generated (block 518), and the procedure set forth in FIG. 26 for error messages carried out, as described below in greater detail (block 520).

Figure 22B:
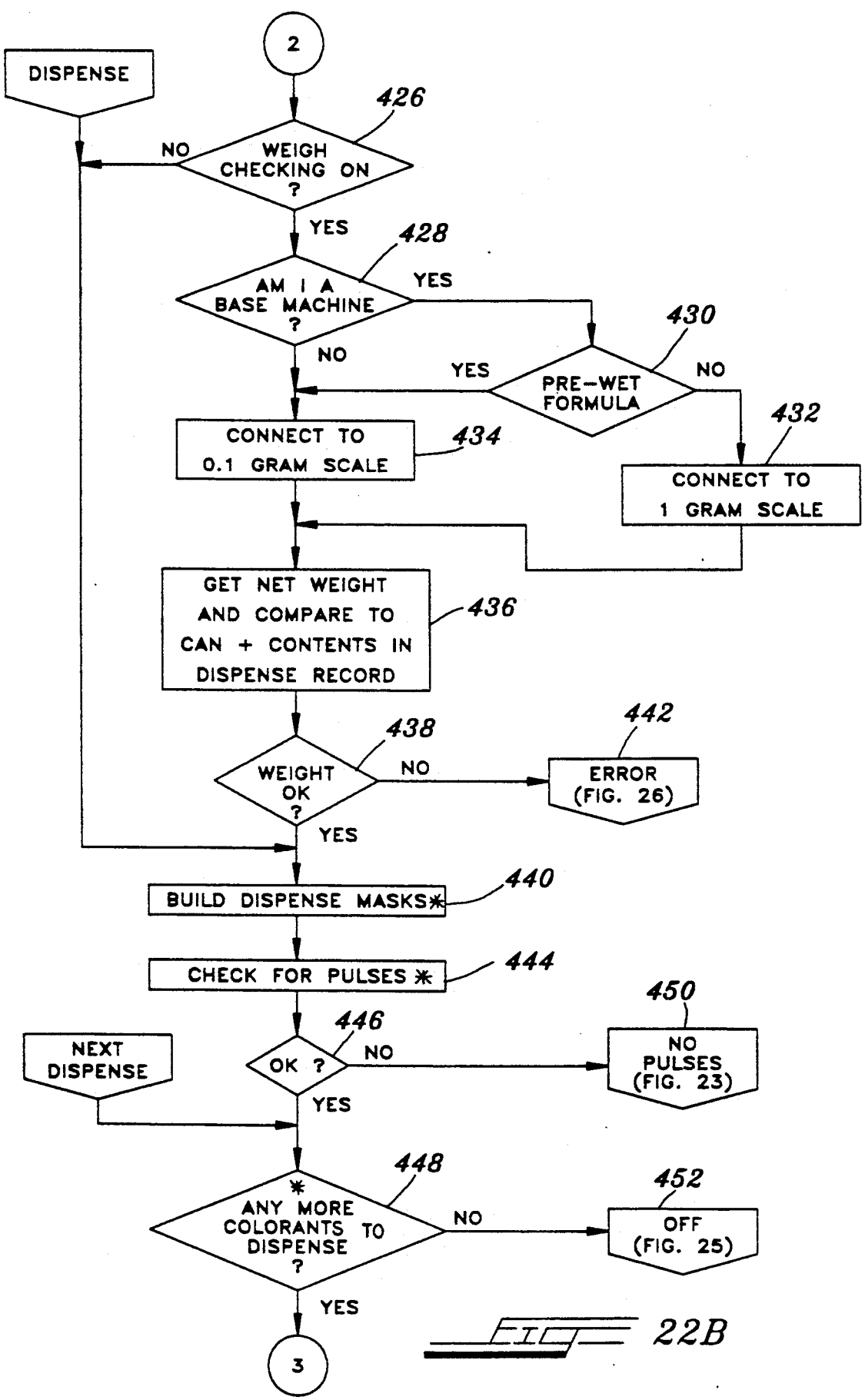
Figure 22C:
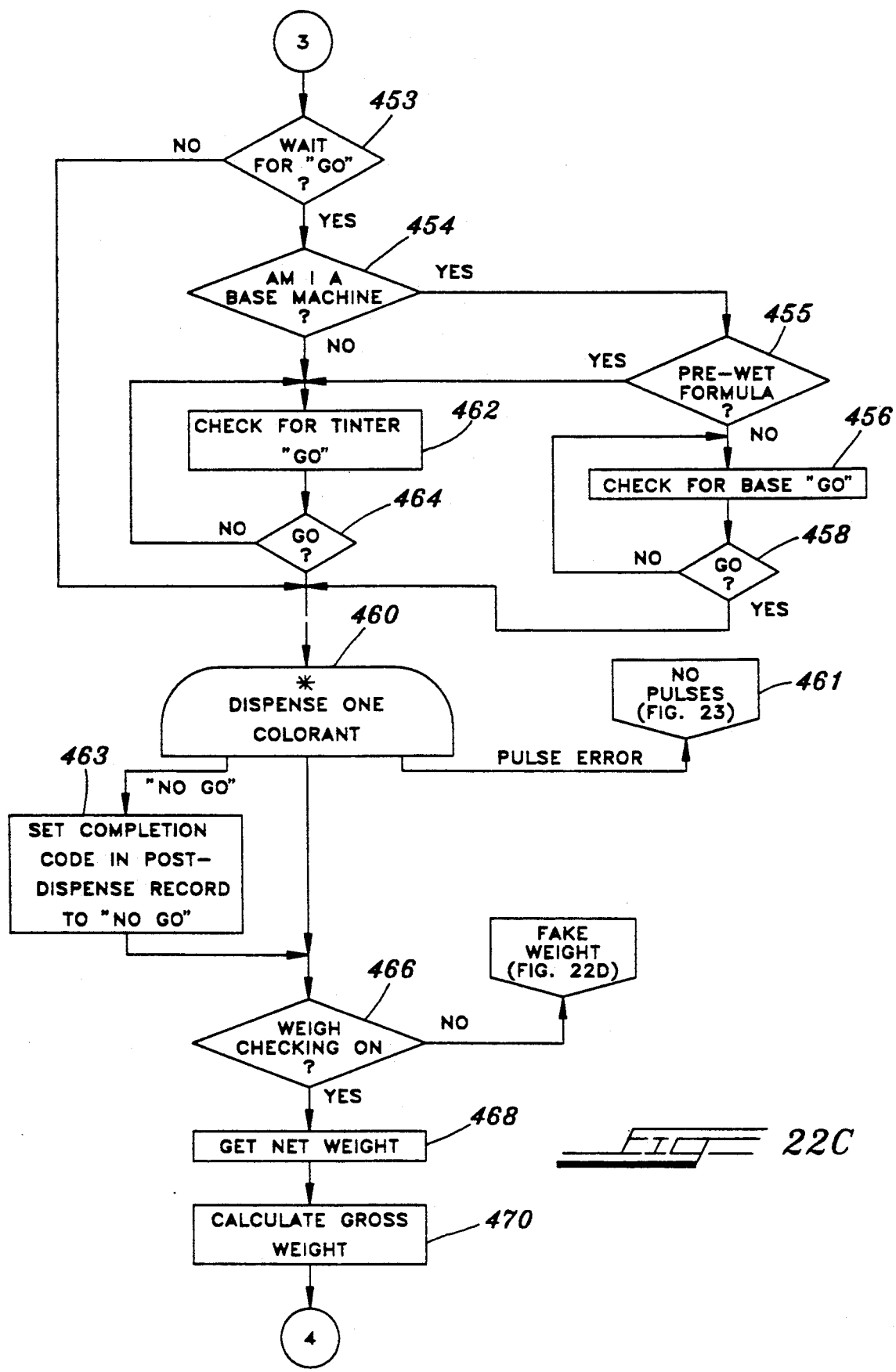
Figure 22D:
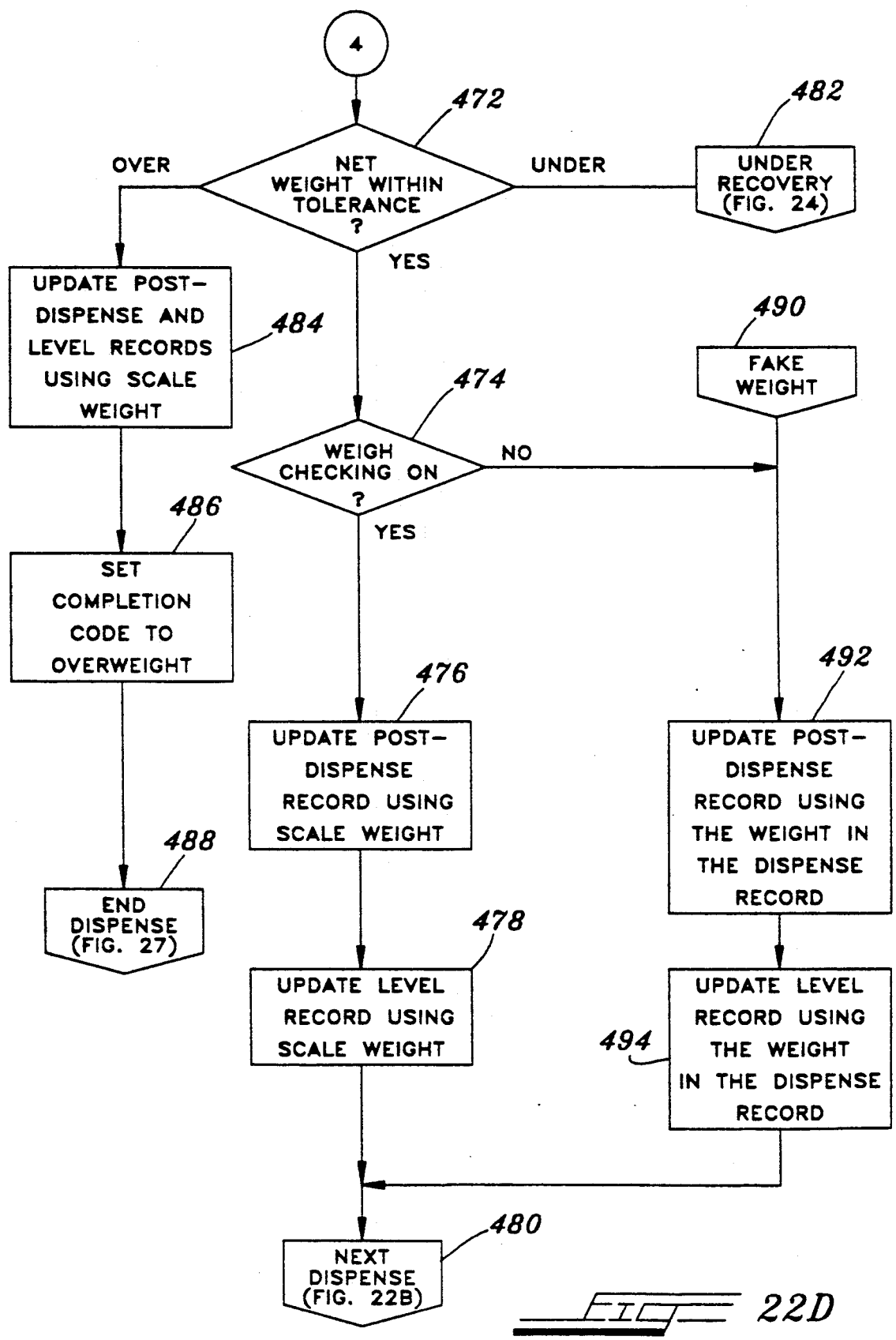

As mentioned above, it may occur that less than the required amount of liquid colorant is dispensed, which may be termed "under-recovery", as shown in block 482 in FIG. 22D, as described above. Under such conditions, the system of the present invention will continually repeat the dispensing of the particular colorant underdispensed in order to acheive the correct amount. FIG. 24 shows this process. When "under-recovery" has been determined (block 530), then it is determined (block 532) whether if there ever was a "no go" error, which is indicative of a lost signal from the cell PLC. If yes, then an error display-message will occur (block 534), and if not, then an "under recovery" counter (block 536) will be incremented, and the logical decision (block 538) determined as to whether this is a first such increment or more, if this is not more than the first increment of the "under-recovery" counter, and similarly if there was a "no go" error, then the "ACCUTINTER" will calculate the corrected dispense using the net weight and target weight in the dispense record for the particular colorant being dispensed (block 540), and will, thereafter, dispense the colorant again, until the correct weight is achieved, by returning to block 448 in FIG. 22B (block 544). If however the "under-recover" counter is incremented a second time, then the completion-code and the post-dispense record is set to underweight (block 540), and a general system error indicated for that particular colorant being dispensed for further investigation, indicating pump or valve-malfunction, and the like. However, the same colorant will attempted to be dispensed again, until the correct weight is achieved, as indicated by block 541-544 as described above.

FIG. 25 indicates the flow chart for the "off sequence", which occurs after the last colorant has been dispensed at the particular dispensing station, as was indicated by block 452 in FIG. 22B. The "off sequence" (block 560) in FIG. 25 will first determine whether there is anything in the 0.01 gram table, which is relevant only to the first tint-station 16, where colorants to be dispensed in quantities less than 6.8 grams are coupled to the 0.01 gram resolution scale-head for determining the fine resolution thereof (block 562). If the logical decision is no, indicating that all of the colorants have been dispensed at the first station 16, or when the dispensing station is the base-station 18, then the conventional recirculation and agitation of the containers at the particular dispensing station is carried out (block 564), and the logical decision of whether the end of the formula has occurred (blocks 566). If the answer is no, which would occur at the tint-station, for the dispensing of the liquid prewet base, then the procedure in FIG. 27 "end dispense" is carried out, which is described below. If it is the end of the formula for the particular station, then the signal is sent to the cell PLC (block 568), after which weight checking is determined (block 570), and if it is on, then the scale is unloaded, or lowered, (block 572). If weight checking is not on, then the program goes directly to the "end dispense" in FIG. 27. However, if there are one or more colorants in the 0.01 gram table, which occurs at the first tint-station 16, then these liquid colorant or colorants are moved to the dispense table (block 563) for setting up the dispensing thereof, during which the 0.01 gram scale-resolution head (block 565) is cleared and the switch over (block 567) to this 0.01 gram scale-head carried out, with the subsequent dispensing of the colorant or colorants in that table (block 569), the sequence returning to FIG. 22B at block (440).

Figure 26:
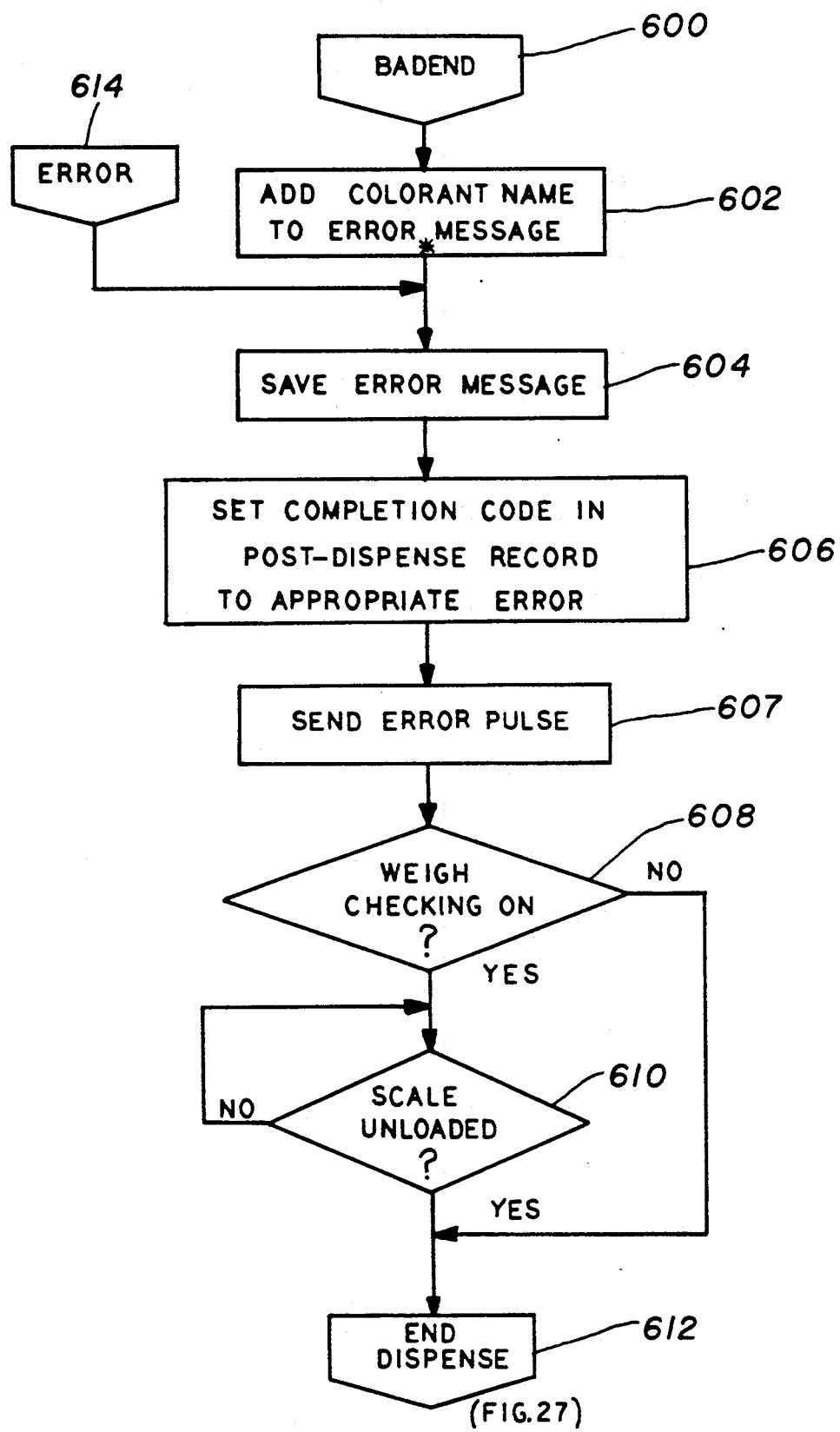

The "bad end" sequence shown in FIG. 26, which has been indicated above by blocks 408' and 414 in FIG. 22A, which, as explained above, occur at the outset where it has been determined that the particular formula requires encoder counts not possible of achievement for the given machine, or where it has been determined that the supply levels at the stations are not sufficient for that particular formula. The "bad end" routine, FIG. 26, simply completes the operation for that particular formula, by simply adding the colorant name to an error message (block 602) and saving it (block 604), after which, the completion code is set in the post-dispense record for the particular formula (block 606), after which, an error pulse is sent (block 607), and if the weight checking has been set, (block 608), the scale is thereafter unloaded (block 610), and if not, then the program simply moves directly to the "end dispense" routine (block 612), as described below in discussing FIG. 27. The same procedure would occur if an error message is generated (block 614), which, as shown, in FIG. 22A occurs if the calibration constants, operating flags, etc. have not been properly properly purged.

Figure 27:
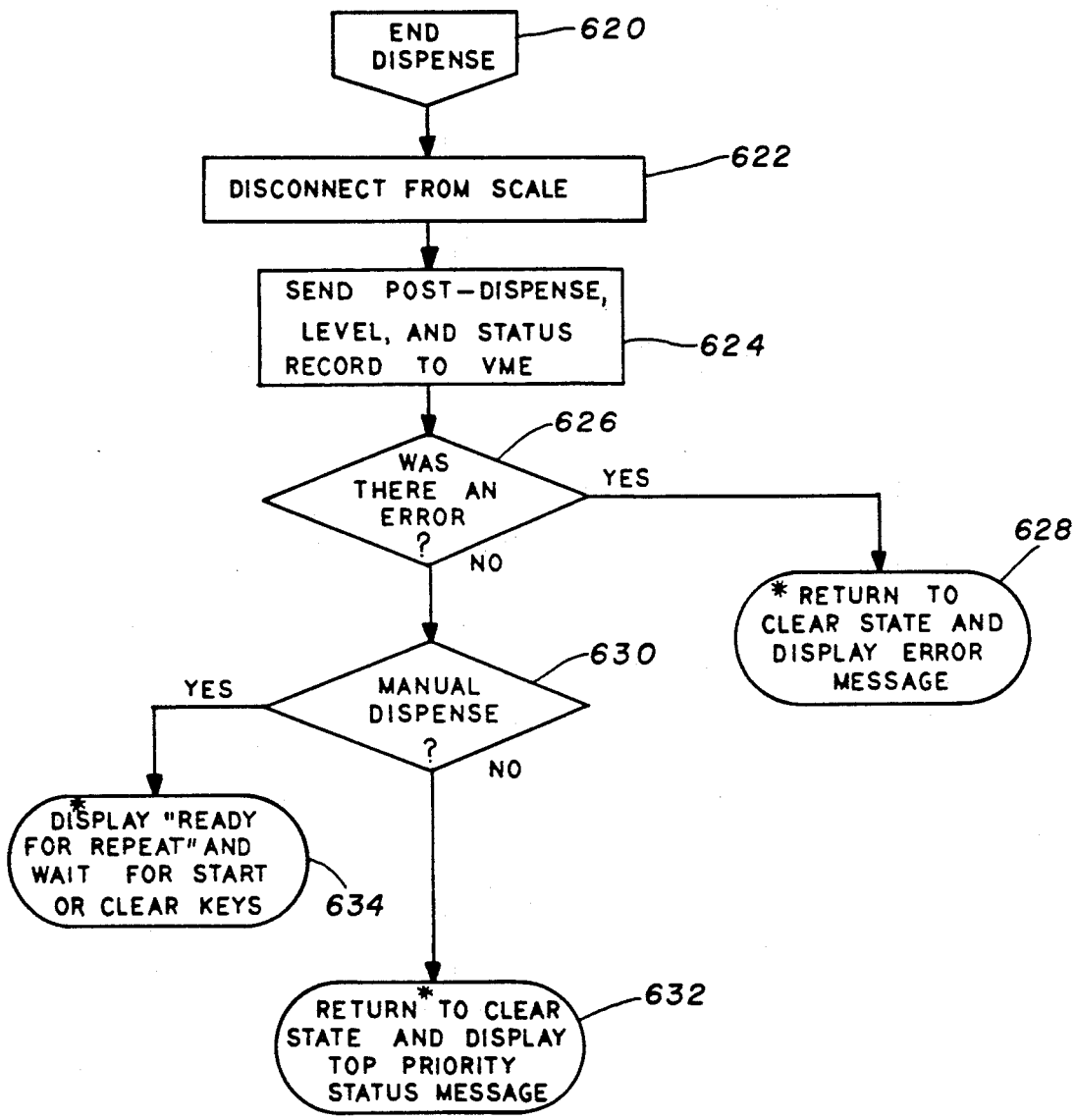

The "end dispense" routine in FIG. 27 (block 620) shows a logic-sequence of events when the dispensing of a particular colorant or base is ended at a particular station and nozzle thereof, or a bad-end or error-pulse generated. The scale-communications are disconnected (block 622), after which, the post-dispense levels of the containers are calculated, and the status thereof recorded in the VME for future use (block 624), and then an error determination is carried out (block 626), and if there was an error, a "clear state" is returned to and a simple error message display is shown (block 628). If there was an error from routine of FIG. 26 or from block 488 in FIG. 22D for an overdispensed ingredient for which a correction formula was not possible, then manual dispense is determined (blocks 630,634). Manual dispense also occurs when the formula was entered by hand at the "ACCUTINTER" keyboard input.

Figure 28:
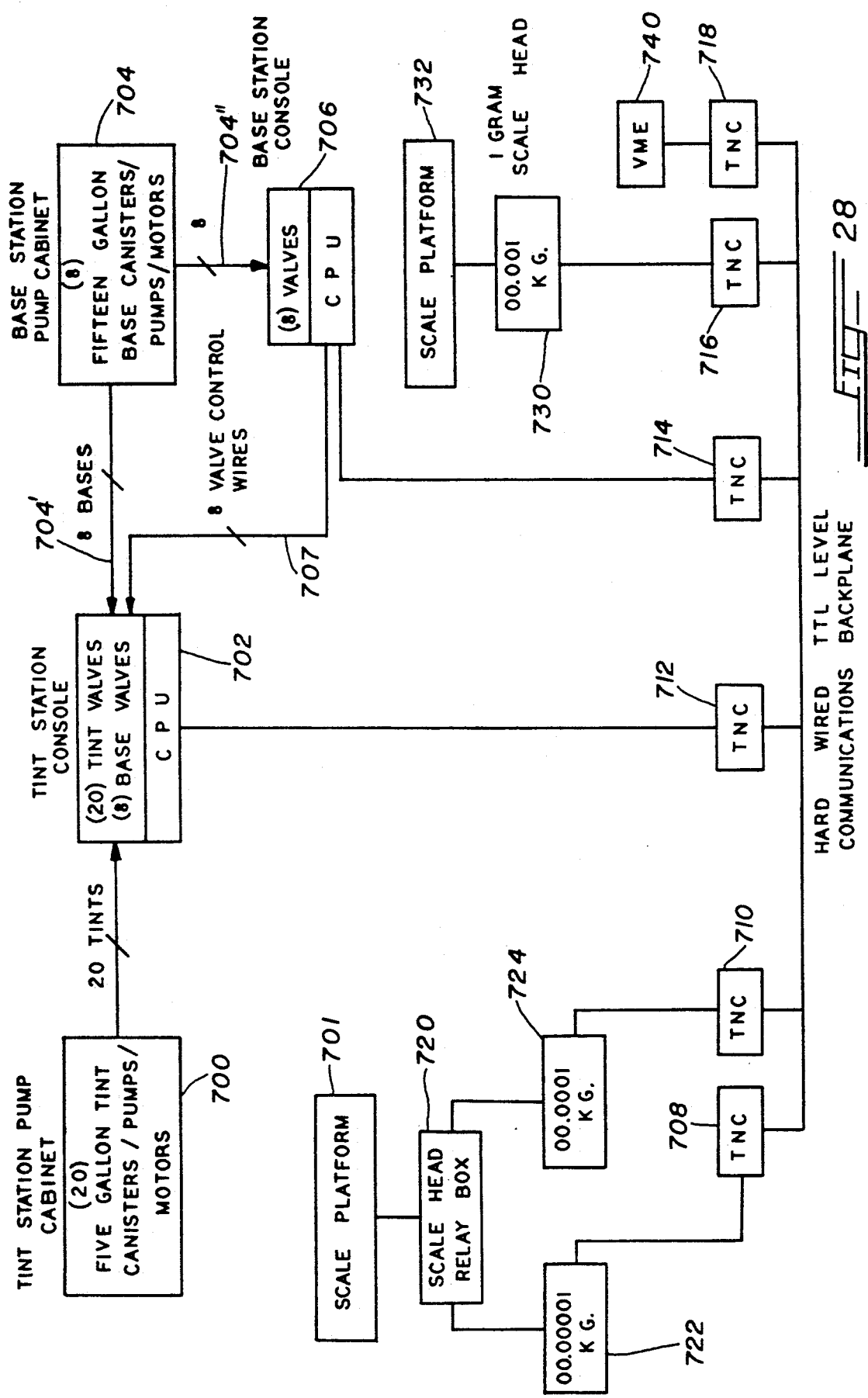
FIG. 28 is a schematic diagram showing the couplings between the tint-station and the base-station of each cell of the invention.
Figure 29:
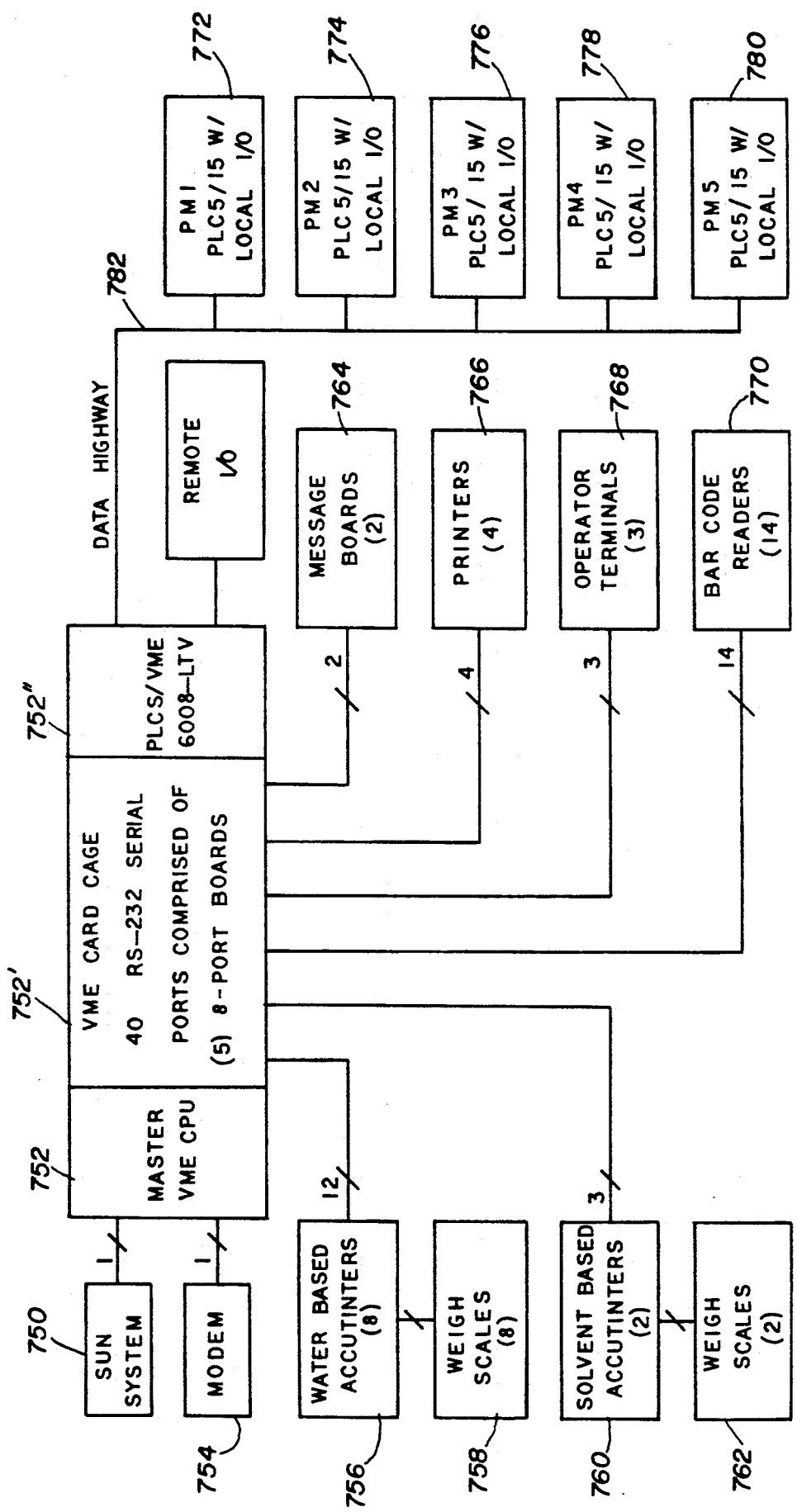
FIG. 29 is a communications schematic showing the couplings between the hierarchal computers systems of the invention.

FIG. 28 shows a detailed coupling schematic of the two dispensing station with their appropriate scale-heads. The tint-station 16 (block 700) in the preferred embodiment is provided with 20 five-gallon tint canisters as well as associated pumps and motors, which tint-station 16 also has 20 tint-valves for dispensing the colorants through associated nozzles (block 702). The tint-station also has 8 base-valves for dispensing the prewet-base delivered thereto from the base-station 18 (block 704), there also being provided associated nozzles therefor. The tint-station has its own CPU, which is similar to those conventionally used with "ACCUTINTERS", this CPU being coupled to the central VME via a terminal-node controller (block 712) for controlling the operation of the tint-station, as described above. The first tint-station 16 also has its scale-platform (block 701) with two scale-heads, as above described (blocks 722, 724), one for the 0.01 gram tolerance, and one for the 0.10 gram tolerance, with a scale-head relay (box 720) providing the switch over, all of which is controlled from the tint and base stations of the "ACCUTINTER" (block 740) via terminal-node controllers 708, 710. The base-station 18 (block 704) has, for example, 8 fifteen-gallon supply canisters for storing the liquid base, water or oil, and associated pumps and motors, for dispensing thereof. The base-station, in the preferred embodiment, has 8 dispensing valves (block 706), and its own CPU. As mentioned above, the prewet base for the tint-station is derived from the base-station, there being eight connecting conduits (block 704') coupling the 8 supply canisters at the base-station with the base-dispensing nozzles and valves at the tint-station (block 702). These base-valves at the tint-station are controlled by the base-station CPU (block 706) via control lines 707. The CPU, as well as the 1-gram scale head of the base-station (blocks 706, 730, 732) are coupled to the central VME system (block 740) via terminal-node controllers 712-718. FIG. 29 shows the hardware connections of the entire system, with the Sun System (block 750), as described above, being coupled to the VME CPU (block 752, 754) with the system VME CPU being coupled to the CPU's of a plurality of "ACCUTINTERS", whether it be station 16 or 18 (block 756) each of which has the appropriate weight scales (block 758), as described above. There are provided five cells, each of which includes one tint-station and one base-station, for a complete total of ten "ACCUTINTERS". One "ACCUTINTER" is used for oil based paints, (blocks 760, 762); however, more may be added. Each station has its own weighing scale and associated control as set forth in FIG. 28. The central processing unit of the VME card cage (block 752') also, as described above, controls the message boards (block 764), printers (block 766), operator terminals (block 768), and the bar-code readers (block 770), all of which are of conventional design. The VME, as described above, is tied to the system PLC which in turn is tied to the five cell PLC's (blocks 752', 773, 774, 776, 778 and 780).

As stated above, entire assembly and process utilize a plurality of paint batching machines. FIGS. 30A and 30B disclose a general assembly line process in which there are provided two separate systems, one for a water-based paint dispensing system, and another one for an oil-based dispensing system. There are four water-base cells indicated by reference numerals 800, 802, 804, 806, and one oil based cell. Each cell includes a tint-station 16, a base-station 18, a pair of five-gallon can paint mixing machines 808, 810, a one-gallon paint mixing machine 842, 20 five-gallon canisters supply area 814, and eight 15 gallon tanks supply area 816, the supply 814 being for the liquid colorants being dispensed at the tint-station 16, while the supply 816 contains the liquid bases. Reference numeral 818 indicates a pail-lowerator, by which the cans are lowered from the storage area to the particular cell sites 800 through 806 to be described below in greater detail, one lowerator per cell. The supply of empty cans is indicated by reference numeral 820, with a conveyer therefrom 822 conveying an empty can, which empty can, whether it be one-gallon or five-gallon can, being detected by the system PLC, it being emphasized that the system of the invention is capable of handling and operating on various combinations of differently-sized paint cans or containers, regardless of the order or sequence thereof as they are conveyed along the automated conveyer system of the invention. The chosen can is conveyed along conveyer 822, to the side labeler device 824, which, as described above, places a label containing the written information about the can. Thereafter, the can is conveyed to the bar-code labeler-machine 826, where the bar-code appropriate to that particular can is printed and attached to the bottom of the can, which bar-code represents the information containing the formula and other information thereon. The can is thereafter conveyed via conveyer 822 to a first pail-lift area 830, where the can is lifted from substantially floor-level to an elevated state thereabove, and conveyed along elevated conveyer 832 to the first bar-code reader 834, where the bar-code paint can is rotated and read by a conventional optical bar-code reader to indicate the appropriate formula in the computer system, to determine the appropriate path set aside for that particular paint can. Thereafter, the can is directed to the lowerator 818 above described, where it is lowered to floor-level again, and conveyed onto input-conveyer 836 of the respective cell 800 through 806 chosen for that particular paint can by the VME and SUN systems. Thereafter, the paint can is conveyed to the second bar-code reader area 838 where the can is again rotated and the paint can's bar-code on bottom thereof again read, in order to obtain the formula thereof and the amount to be dispensed, by quantity and type of colorant to be dispensed at the tint-station 16. At station 838, the can again is rotated as before. From station 838, the can is conveyed to the tint-station 16, and acted upon as described above with reference to FIGS. 1 through 16. After the completion at the tint-station 16, the can is conveyed to the base-station 18, before which, however, the can is read by the optical reader for the base-station, as described above with reference to FIGS. 1 through 16, and, thereafter, the can is conveyed to the base-station 18 for the dispensing of the remainder of the base. When the remainder of the base has been dispensed, the can is then conveyed to a conventional lidder 840, and from there, to one of the paint mixing machines 842, 808 or 810, depending upon the size thereof. Upon exiting a respective paint mixing machine, the can is conveyed along line-conveyer 844 if it is a one-gallon can, or line 846 if it is a five-gallon can, and directed onto the output-conveyer 850 for transport to the storage and palletizing area indicated generally by reference numeral 900 in FIG. 30B. At the palletizing area 900, the can's bar-code is read for the fourth and last time, at optical bar-code reader-station 902 to determine which of the palletizing tracks 904 through 914 the can is to be conveyed. The above procedure was described for the cell 800, it being understood that the exact same procedure will take place at each of the cells 802, 804 and 806, as well as for the oil-base line, for a particular paint can, whether it be one or five-gallon can being conveyed to the particular one of the cells 802 through 806, after the determination made at the optical bar-code reader-station 834. Each cell 800 through 806 is also provided with an elecrtical panel 831 and appropriate coupling-connections for the computer hardware and software. The cells 800 through 806 are used for water-base, while one additional cell 960 shown in FIG. 30A is used for an oil-base paint processing. The cell 960 is enclosed in a separate room which is fire-protected, owing to the flammability of oil-base paint. A supply of empty cans is also housed in an area 820' for both the oil-base, which is the same location as the supply of cans for the water-base lines. The oil-base cell 960 includes the same components as each of the water-base cells, and has its own output conveyer 950 for conveying the finished cans to the palletizing area 900 in the same manner as above-described. A path 911 is also provided having a conveyer thereon by which rejected cans, from the oil-base line, are transported. Central console room computer room 978 is provided which is for the operator console of the VME system. A separate area 980 is also provided for storing the inventory-supply of liquid base, in 1100 gallon containers.

While a specific embodiment of the invention has been shown and described, it is to be understood that numerous changes and modifications may be made therein without departing from the scope, spirit and intent of the invention as set forth in the appended claims.

What we claim is:

1. A method of formulating paint by dispensing paint ingredients into a paint can, in an apparatus comprising a first tint-dispensing station storing various liquid colorants for dispensing thereat, and a second base-dispensing station storing liquid base for dispensing thereat, said method comprising:
   (a) conveying a paint can to a first tint-dispensing station;
   (b) dispensing a prewetting amount of liquid base at the first tint-dispensing station;
   (c) after said (b) step, dispensing liquid colorants, one at a time, at said first tint-dispensing station making up the formula of the color of the paint for the paint can;
   (d) after said step (c), conveying the partially-filled paint can to a second base-dispensing station;
   (e) dispensing the remaining volume of liquid base of the particular formula for the respective paint can at the second base-dispensing station;
   (f) thereafter, conveying the paint can from the second base-dispensing station.

2. The method of formulating paint by dispensing paint ingredients into a paint can according to claim 1, wherein the second base-dispensing station comprises a supply of liquid base, said method further comprising:
   (g) coupling the supply of liquid base at the second base-dispensing station with the first tint-dispensing station for dispensing the liquid base at the first tint-dispensing station;
   said step (b) comprising feeding liquid base from the supply of liquid base at the second base-dispensing station to the first tint-dispensing station for flow from an outlet-nozzle of the first tint-dispensing station.

3. The method of formulating paint by dispensing paint ingredients into a paint can according to claim 1, wherein each paint can is provided with bar-code information thereon referring to memory-address for the color-formula for that particular paint-can, further comprising:
   (g) optically-scanning the bar-code information on the paint can at a first bar-code reading station for determining the information thereof before said step (b);
   (h) determining the color formula for the contents of the paint can;
   (i) said steps (b) and (c) being carried out after said (h);
   (j) optically-scanning second the bar-code information on the paint can at a second bar-code reading station for determining the information thereof after said step (c);
   (k) determining the color formula for the contents of the paint can a second time;
   (l) said steps (j) and (k) being carried out before said step (e).

4. The method of formulating paint by dispensing paint ingredients into a paint can according to claim 3, wherein each of said steps (g) and (j) comprises rotating the can, and reading the bar-code on the can by a stationarily-mounted optical scanner.

5. The method of formulating paint by dispensing paint ingredients into a paint can according to claim 3, wherein said step (j) comprises conveying the paint can from the first tint-dispensing station to the second bar-code reading station, said step (d) being performed after said step (j).

6. The method of formulating paint by dispensing paint ingredients into a paint can according to claim 5, wherein said step (j) comprises rotating the can, and reading the bar-code on the can by a stationarily-mounted optical scanner; said step of rotating the can comprising laterally, inwardly moving the can toward a roller and positioning the can partially off the conveyer by which it was conveyed during said step of conveying the can from the first tint-dispensing station to the second bar-code reading station, and, thereafter, rotating the can at least one time.

7. The method of formulating paint by dispensing paint ingredients into a paint can according to claim 5, wherein there is also provided a first pair of guide-rails for the conveyer used in said step (a), and a second pair of guide-rails used in said step of conveying from said first tint-station to said second bar-code reading station, and a third pair of guide-rails used in said step (d), and a fourth pair of guide-rails for the conveyer used in said step (f), said method further comprising:
   (m) spacing the first pair of guide-rails a predetermined lateral distance apart for guiding a paint can of one of a first size and second size along the conveyer during said step (a);

(n) spacing the second pair of guide-rails a predetermined lateral distance apart for guiding a paint can of one of a first size and a second size along the conveyer during said step of conveying the can from said first tint-dispensing station to the second bar-code reading station;

(o) spacing the third pair of guide-rails a predetermined lateral distance apart for guiding a paint can of one of a first size and a second size along the conveyer during said step (d); and (p) spacing the fourth pair of guide-rails a predetermined lateral distance apart for guiding a paint can of one of a first size and a second size along the conveyer during said step (f), each said step (m), (n), (o) and (p) being carried out independently of the other of said steps (m), (n), (o), and (p).

8. The method of formulating paint by dispensing paint ingredients into a paint can according to claim 1, wherein there is also provided a first pair of guide-rails for the conveyer used in said step (a), and a second pair of guide-rails for the conveyer used in said step (d), said method further comprising:

(g) spacing the first pair of guide-rails a predetermined lateral distance apart for guiding a paint can of a first size along the conveyer during said step (a);

(h) spacing the second pair of guide-rails a predetermined lateral distance apart for guiding a paint can of a second size along the conveyer during said step (d), whereby different sized paint cans may be accomodated.

* * * * *

UNITED STATES PATENT AND TRADEMARK OFFICE
CERTIFICATE OF CORRECTION

PATENT NO. : 5,083,591
DATED : JANUARY 28, 1992
INVENTOR(S) : KENNETH EDWARDS ET AL

It is certified that error appears in the above-identified patent and that said Letters Patent is hereby corrected as shown below:

IN THE CLAIMS:

Column 25, line 56, after "said", the word -- step -- should be inserted;

Column 25, line 56, after "(b)", the word "step" should be deleted;

Column 26, line 26, before "optically-scanning", the word -- second -- should be inserted;

Column 26, line 26, after "optically-scanning", the word "second" should be deleted.

Signed and Sealed this

Third Day of August, 1993

Attest:

MICHAEL K. KIRK

Attesting Officer
Acting Commissioner of Patents and Trademarks